US012766456B2

(12) United States Patent
Smales et al.

(10) Patent No.: US 12,766,456 B2
(45) Date of Patent: Oct. 20, 2026

(54) SORBENT DEVICES

(71) Applicant: CALGON CARBON CORPORATION, Moon Township, PA (US)

(72) Inventors: Matthew P. Smales, Monroeville, PA (US); Joseph E. Cole, New Castle, PA (US)

(73) Assignee: CALGON CARBON CORPORATION, Moon Township (PA)

(*) Notice: Subject to any disclaimer, the term of this patent is extended or adjusted under 35 U.S.C. 154(b) by 0 days.

(21) Appl. No.: 17/322,351

(22) Filed: May 17, 2021

(65) Prior Publication Data

US 2021/0354075 A1 Nov. 18, 2021

Related U.S. Application Data

(60) Provisional application No. 63/025,658, filed on May 15, 2020.

(51) Int. Cl.

*B01D 53/04* (2006.01)
*F02M 25/08* (2006.01)

(52) U.S. Cl.

CPC ..... *B01D 53/0415* (2013.01); *F02M 25/0854* (2013.01); *B01D 2253/102* (2013.01); *B01D 2253/34* (2013.01); *B01D 2257/702* (2013.01); *B01D 2259/4516* (2013.01)

(58) Field of Classification Search

CPC ............ B01D 53/0415; B01D 2253/34; B01D 2253/102; B01D 2257/702; B01D 2259/4516; F02M 25/0854

See application file for complete search history.

(56) References Cited

U.S. PATENT DOCUMENTS

| | | | |
|---|---|---|---|
| 2,038,071 | A | 4/1936 | Wilhelm |
| 3,164,452 | A | 1/1965 | Westeren |
| 3,713,281 | A | 1/1973 | Asker et al. |
| 3,730,158 | A | 5/1973 | St. Amand |
| 3,757,488 | A | 9/1973 | Austin et al. |
| 3,867,111 | A | 2/1975 | Knowles |
| 4,331,639 | A | 5/1982 | Hass et al. |

(Continued)

FOREIGN PATENT DOCUMENTS

| | | |
|---|---|---|
| CN | 1265050 A | 8/2000 |
| EP | 0433677 A1 | 6/1991 |

(Continued)

OTHER PUBLICATIONS

Bian et al. (Experimental and modeling study of pressure drop across electrospun nanofiber air filters, Building and Environment 142 (2018) 244-251, see pp. 245-246, Section 2.1 Theoretical Model) (Year: 2018).*

(Continued)

*Primary Examiner* — Youngsul Jeong

(74) *Attorney, Agent, or Firm* — DLA Piper LLP (US)

(57) ABSTRACT

A layered sorbent material sheet includes a substrate sheet and a spacer sheet. The spacer sheet defines a plurality of spaced apart sorbent material strips. The sheets may be layered or rolled together. Multiple layers of alternating sheets are also disclosed. In some embodiments, the sorbent material sheets are arranged in a stacked configuration.

17 Claims, 7 Drawing Sheets

(56) References Cited

U.S. PATENT DOCUMENTS 4,338,101 A 7/1982 Tuttle
4,343,629 A 8/1982 Dinsmore et al.
4,418,662 A 12/1983 Engler et al.
4,444,727 A 4/1984 Yanagihara et al.
5,016,628 A 5/1991 Lambert
5,021,071 A 6/1991 Reddy
5,064,805 A 11/1991 Otowa
5,194,414 A 3/1993 Kuma
5,207,734 A 5/1993 Day et al.
5,310,593 A 5/1994 Tsujimoto et al.
5,322,778 A 6/1994 Antrim et al.
5,348,755 A 9/1994 Roy
5,352,274 A 10/1994 Blakley
5,500,038 A 3/1996 Dauber et al.
5,598,721 A 2/1997 Rockenfeller et al.
5,658,369 A 8/1997 Kusay
5,713,881 A * 2/1998 Rezai ................ A61F 13/15707 604/382
5,726,118 A 3/1998 Ivey et al.
5,754,002 A 5/1998 Haitko et al.
5,820,644 A 10/1998 Mori et al.
5,821,682 A 10/1998 Foust et al.
5,861,050 A 1/1999 Pittel et al.
5,871,568 A 2/1999 Gibson
5,897,779 A 4/1999 Wisted et al.
5,952,420 A 9/1999 Senkus et al.
5,964,221 A 10/1999 McKenna
6,047,687 A 4/2000 Ishikawa et al.
6,146,451 A 11/2000 Sakata et al.
6,176,897 B1 1/2001 Keefer
6,186,939 B1 2/2001 Forrester
6,261,345 B1 7/2001 Miyano et al.
6,280,824 B1 8/2001 Insley et al.
6,342,129 B1 1/2002 Vaughn et al.
6,406,523 B1 6/2002 Connor et al.
6,472,343 B1 10/2002 McCrae et al.
6,540,815 B1 4/2003 Hiltzik et al.
6,599,856 B1 7/2003 Uchino et al.
6,652,627 B1 11/2003 Tonkovich et al.
6,699,393 B2 3/2004 Baker et al.
6,706,194 B2 3/2004 Baker et al.
6,848,374 B2 2/2005 Srinivasachar et al.
RE38,844 E 10/2005 Hiltzik et al.
7,077,891 B2 7/2006 Jaffe et al.
7,132,007 B1 11/2006 Von Blücher et al.
7,222,612 B2 5/2007 Hagler et al.
7,278,406 B2 10/2007 Hagler
7,291,208 B2 * 11/2007 Dauber .............. B01D 53/0407 96/139
7,326,278 B2 2/2008 Butters et al.
7,531,029 B2 5/2009 Hoke et al.
7,547,350 B2 6/2009 Callahan et al.
7,578,285 B2 8/2009 Buelow et al.
7,666,507 B2 2/2010 Ishikawa et al.
7,704,305 B2 4/2010 Nishida
7,708,817 B2 5/2010 Hurley et al.
7,744,677 B2 6/2010 Barclay et al.
7,780,765 B2 8/2010 Srinivasachar et al.
7,858,061 B2 12/2010 Varma et al.
7,862,725 B2 1/2011 Mazyck et al.
7,879,136 B2 2/2011 Mazyck
8,034,163 B1 10/2011 Durham et al.
8,042,524 B2 10/2011 Elum et al.
8,057,576 B1 11/2011 Pollack
8,069,797 B2 12/2011 Srinivasachar et al.
8,080,088 B1 12/2011 Srinivasachar
8,168,147 B2 5/2012 Olson et al.
8,262,785 B2 9/2012 Barron et al.
8,263,524 B1 9/2012 Skandan et al.
8,372,477 B2 2/2013 Buelow et al.
8,632,334 B2 1/2014 Knueppel et al.
8,852,322 B2 10/2014 Gupta et al.
8,864,877 B2 10/2014 Nishita et al.
8,888,901 B2 11/2014 Kimoto
9,138,684 B2 9/2015 Li et al.
9,732,649 B2 8/2017 Hiltzik et al.
11,697,090 B2 7/2023 Greenbank et al.
11,697,580 B2 7/2023 Greenbank et al.
11,703,016 B2 7/2023 Greenbank et al.
12,076,687 B2 9/2024 Greenbank et al.
12,076,876 B1 9/2024 Greenbank et al.
12,318,758 B2 6/2025 Greenbank et al.
2002/0124732 A1 9/2002 Hara et al.
2002/0124733 A1 9/2002 Iriyama et al.
2002/0150806 A1 10/2002 Stenersen et al.
2002/0170436 A1 11/2002 Keefer et al.
2003/0037672 A1 2/2003 Sircar
2003/0116021 A1 6/2003 Oda et al.
2003/0188663 A1 10/2003 Barthel et al.
2004/0116014 A1 6/2004 Soerens et al.
2004/0118287 A1 6/2004 Jaffe et al.
2004/0118387 A1 6/2004 Lawrence
2004/0197612 A1 10/2004 Keefer et al.
2004/0262217 A1 12/2004 Mori et al.
2005/0081717 A1 4/2005 Meiller et al.
2005/0167367 A1 8/2005 Baker
2005/0172805 A1 8/2005 Motono et al.
2005/0211099 A1 9/2005 Doughty et al.
2005/0241479 A1 11/2005 Lebowitz et al.
2005/0279210 A1 12/2005 Hirata
2006/0032372 A1 2/2006 Dauber et al.
2006/0042467 A1 3/2006 Maru
2006/0054142 A1 3/2006 Burke et al.
2006/0142154 A1 6/2006 Wolff
2006/0205830 A1 9/2006 Lebowitz et al.
2006/0283996 A1 * 12/2006 Jensen .............. A61F 13/01021 241/195
2007/0034193 A1 2/2007 King
2007/0101865 A1 5/2007 Kim et al.
2007/0113740 A1 5/2007 Oda
2007/0169758 A1 7/2007 Mills
2007/0272080 A1 11/2007 Allen et al.
2008/0121142 A1 5/2008 Comrie et al.
2008/0141637 A1 6/2008 Hirata et al.
2008/0308075 A1 12/2008 Allen et al.
2009/0025553 A1 1/2009 Keefer et al.
2009/0172998 A1 7/2009 Harris et al.
2009/0223370 A1 9/2009 Kosugi et al.
2010/0018396 A1 1/2010 Ding et al.
2010/0178624 A1 7/2010 Srinivasachar
2010/0300288 A1 12/2010 Boulet et al.
2010/0316538 A1 12/2010 Buelow et al.
2011/0030592 A1 2/2011 Baldrey et al.
2011/0072974 A1 3/2011 Patel
2011/0100223 A1 5/2011 Tarrant et al.
2011/0214572 A1 9/2011 Hasegawa et al.
2012/0048110 A1 3/2012 Dawes et al.
2012/0079926 A1 4/2012 Long et al.
2012/0100054 A1 4/2012 Durham et al.
2013/0078169 A1 3/2013 LaFlesh et al.
2013/0109562 A1 5/2013 Wong et al.
2013/0186375 A1 7/2013 Hasegawa et al.
2013/0263741 A1 10/2013 Mani et al.
2013/0269532 A1 10/2013 Kimoto
2013/0276634 A1 10/2013 McKenna et al.
2013/0330257 A1 12/2013 Tramposch
2014/0117054 A1 5/2014 Ryan et al.
2014/0165542 A1 6/2014 Loftin et al.
2014/0216261 A1 8/2014 Fleming, Jr.
2014/0243512 A1 8/2014 Arendt et al.
2014/0295134 A1 10/2014 Wood et al.
2014/0352542 A1 12/2014 Mani
2014/0374655 A1 12/2014 Mimna
2015/0050202 A1 2/2015 Filippelli et al.
2016/0030914 A1 2/2016 Boenkendorf et al.
2016/0031318 A1 2/2016 Shimokawa
2016/0166972 A1 6/2016 Owens et al.
2016/0271555 A1 9/2016 Hiltzik et al.
2018/0030871 A1 2/2018 Hiltzik et al.
2018/0185970 A1 7/2018 Simmons
2018/0214816 A1 8/2018 Greenbank
2018/0363594 A1 12/2018 Byrne et al.
2019/0134558 A1 5/2019 Billiet et al.
2019/0247831 A1 8/2019 Tramposch et al.

(56) References Cited

U.S. PATENT DOCUMENTS

| | | | |
|---|---|---|---|
| 2019/0262573 A1 | 8/2019 | McKenna et al. |
| 2020/0038798 A1 | 2/2020 | Greenbank et al. |
| 2020/0039809 A1 | 2/2020 | Greenbank et al. |
| 2020/0040851 A1 | 2/2020 | Greenbank et al. |
| 2021/0023532 A1 | 1/2021 | Greenbank et al. |
| 2021/0039037 A1 | 2/2021 | Greenbank et al. |
| 2021/0146295 A1 | 5/2021 | Greenbank |
| 2021/0172402 A1 | 6/2021 | Byrne et al. |

FOREIGN PATENT DOCUMENTS

| | | | | |
|---|---|---|---|---|
| EP | 1413348 | A1 | 4/2004 | |
| EP | 1377520 | B1 | 3/2014 | |
| EP | 2125162 | B1 | 7/2014 | |
| FR | 3035196 | A1 | 10/2016 | |
| FR | 3076743 | A1 | 7/2019 | |
| GB | 1336241 | A | 11/1973 | |
| JP | S55-107056 | A | 8/1980 | |
| JP | H04265461 | A | 9/1992 | |
| JP | H07269421 | A | 10/1995 | |
| JP | H08224422 | A | 9/1996 | |
| JP | 3048434 | U | 5/1998 | |
| JP | 2001-505813 | A | 5/2001 | |
| JP | 2004-154652 | A | 6/2004 | |
| JP | 2006-068588 | A | 3/2006 | |
| JP | 2008023365 | A | 2/2008 | |
| JP | 2013188715 | A | 9/2013 | |
| JP | 2016500784 | A | 1/2016 | |
| JP | 2018505071 | A | 2/2018 | |
| KR | 890000460 | B1 | 3/1989 | |
| KR | 20070083883 | A | 8/2007 | |
| KR | 10-1118048 | B1 | 2/2012 | |
| KR | 2016-0107150 | A | 9/2016 | |
| WO | 9851397 | A1 | 11/1998 | |
| WO | 2004089501 | A2 | 10/2004 | |
| WO | 2010042321 | A1 | 4/2010 | |
| WO | 2011038415 | A2 | 3/2011 | |
| WO | 2011127323 | A2 | 10/2011 | |
| WO | 2013063490 | A1 | 5/2013 | |
| WO | 2013083992 | A1 | 6/2013 | |
| WO | 2014082076 | A1 | 5/2014 | |
| WO | 2014088630 | A1 | 6/2014 | |
| WO | 2014205200 | A1 | 12/2014 | |
| WO | 2015/053815 | A1 | 4/2015 | |
| WO | WO-2018144588 | A1 * | 8/2018 | ............ B01D 53/02 |
| WO | WO-2019018587 | A1 * | 1/2019 | ............ A61M 5/165 |
| WO | 2020028703 | A2 | 2/2020 | |
| WO | 2020028839 | A1 | 2/2020 | |
| WO | 2020028845 | A1 | 2/2020 | |
| WO | 2024038421 | A1 | 2/2024 | |

OTHER PUBLICATIONS

Raposo et al., Mercury Speciation in Fluorescent Lamps by Thermal Release Analysis (2003), Waste Management 23(10):879-886.

Korea Auto News, "22. Introduction to ORVR (Onboard Refueling Vapor Recovery System) System", Automotive Industry Specialized Portal, Jan. 2018, retrieved from URL:, https://www.korea-autonews.com/entry/ORVROnboard-Refueling (5 total pages).

Garn et al. "Development and evaluation of a silver mordenite composite sorbent for the partitioning of xenon from krypton in gas compositions" Dec. 22, 2015, Journal of Nuclear Science and Technology, 53(10):1484-1488.

Guo et al. "Preparation and methane adsorption performance of petroleum coke-based activated carbon" Sep. 15, 2013, Chemical Industry and Engineering Progress, 32(z1):8 pages (with English Abstract).

* cited by examiner

SORBENT DEVICES

CROSS REFERENCE TO RELATED APPLICATIONS

This application claims priority to U.S. Provisional Application No. 63/025,658 entitled “Sorbent Devices” filed on May 15, 2020, which is incorporated by reference herein in its entirety.

BACKGROUND

Evaporative emissions from gasoline and other liquid hydrocarbon fuels are a significant source of air pollution because the various hydrocarbons contained in the fuels can form photochemical smog on exposure to sunlight. The compounds of this smog and the hydrocarbons themselves cause degrading health effects in humans and animals as well as environmental damage. Evaporative emissions are especially problematic during vehicle refueling because the “empty” fuel tank is actually filled with fuel vapors, and the act of filling the tank with liquid fuel displaces the vapors from the tank. Evaporative emissions also occur when the fuel within the tank is heated, such as from hot ambient conditions or from nearby hot exhaust system components. Without controls, fuel vapors would be released as pollution into the atmosphere.

In the automotive sector, gasoline vapors are typically recovered during refueling by an Onboard Refueling Vapor Recovery (ORVR) canister system. These devices include multiple components which are designed to capture the displaced vapors from gasoline refueling and allow the engine to burn them at a later time. Vapors remain contained within the fuel tank by specially designed tanks and fuel filler neck, and excess vapor that would otherwise escape is captured and adsorbed within a chemical canister. During engine operation, the Engine Control Unit (ECU) permits adsorbed vapors to be released from the canister and into the engine fuel system, burning the gasoline vapors as normal and permitting the canister to be used again.

While ORVR systems have been successful in reducing vapor emissions, they still have drawbacks. The canisters are filled with loose adsorbent particles such as activated carbon or charcoal, which can be messy to handle and package. These canisters are bulky and heavy because the adsorbent particles cannot physically support themselves, and because stringent emissions regulations now prohibit the release of even small amounts of vapor emissions, which requires higher adsorbent capacity. Manufacturing, maintenance and disposal of the canisters is also cumbersome because of the loose adsorbent particulates, and the complexity of ORVR devices increases the cost of each vehicle while cutting into valuable passenger and cargo space. With automakers demanding lighter weights from all components to meet increasing fuel efficiency targets, as well as cost reductions and greater passenger and cargo space, there is a need for new ORVR devices and that are smaller, lighter, simpler, and more cost effective, while still complying with stricter emissions targets.

SUMMARY

Some embodiments provide a sorbent material sheet product comprising an unitary sorbent sheet.

In one embodiment, there is a sorbent material sheet product comprising: unitary sorbent sheet including: a substrate sheet; a spacer sheet having a plurality of spaced apart strips and a plurality of intervening spaces; and wherein the substrate sheet and the spacer sheet are arranged as adjacent touching layers and one or more of the substrate sheet and the spacer sheet are made from sorbent material.

In another embodiment, the spacer sheet is made from sorbent material.

In another embodiment, both the substrate sheet and the spacer sheet are made from sorbent material, and each sorbent material of the substrate sheet and the spacer sheet is different.

In another embodiment, the sorbent material sheet product comprises a plurality of spacer sheets and at least one of the plurality of the spacer sheets is a continuous spacer sheet that is made from foam and does not have any intervening spaces.

In another embodiment, one or more of the spaced apart strips comprise at least two sub-strips forming a cross-channel between adjacent ones of the intervening spaces.

In another embodiment, the substrate sheet has a length and a width and the spacer sheet has a length and a width, wherein the length of the substrate sheet and the length of the spacer sheet are substantially the same and the width of the substrate sheet and the width the spacer sheet are substantially the same.

In another embodiment, the substrate sheet has a length and a width and the spacer sheet has a length and a width, wherein the substrate sheet and the spacer sheet are different from each other at least with respect to length or width.

In another embodiment, the spacer sheet has a length and a width, and further comprises frame sections along the length and frame sections along the width, wherein the plurality of spaced apart strips extend perpendicularly between the frame sections along the width of the spacer sheet.

In another embodiment, the spacer sheet has a length and a width, and the spaced apart strips extend perpendicularly to the length of the spacer sheet.

In another embodiment, the adjacent ones of the plurality of spaced apart strips form the plurality of intervening spaces such that the plurality of intervening spaces extend between and open at each longitudinal edge.

In another embodiment, the unitary sorbent sheet is spiral wound to form adjacent layers of the unitary sorbent sheet such that fluid can flow around and between adjacent layers of the unitary sorbent sheet.

In another embodiment, the unitary sorbent sheet has a generally cylindrical shape having a length that is greater than a diameter of the sorbent sheet.

In another embodiment, the unitary sorbent sheet is spiral wound about a core such that fluid can flow around and between adjacent sheet layers.

In another embodiment, the core is made from a sorbent material.

In another embodiment, the sorbent material sheet product further comprises a reinforcing layer.

In another embodiment, is arranged in a housing at least partially encapsulating the sorbent sheet.

In another embodiment, the housing is flexible.

In another embodiment, the housing is a vapor adsorbing canister.

In another embodiment, the vapor adsorbing canister is part of an onboard refueling vapor recovery apparatus.

In one embodiment, there is a method of making a sorbent sheet having a substrate sheet comprising a sorbent material sheet, a spacer sheet having a plurality of spaced apart strips and a plurality of intervening spaces, wherein the substrate sheet and the spacer sheet are arranged as adjacent touching layers, the method comprising: removing a plurality of sections of material from a first material sheet; and contacting a bottom surface of the first material sheet to a top surface of a second material sheet, wherein one or more of the first material sheet or the second material sheet is made of sorbent material.

In another embodiment, the removing a plurality of sections from a first material sheet is performed using a cutting die.

In another embodiment, the method further comprises: removing from a middle portion of the first material sheet a plurality of sections substantially parallel to each other, such that a frame of material remains around the plurality of sections; and trimming the sorbent sheet such that no frame remains around the plurality of sections.

In another embodiment, the method further comprises: winding the sorbent sheet about itself parallel to the plurality of sections to form a cylinder.

In another embodiment, contacting the bottom surface of the first material sheet to the top surface of the second material sheet is performed with one or more of inserting an intervening adhesive layer, inserting an intervening primer surface treatment, ultrasonic bonding, thermal bonding, or corona discharge treatment.

DRAWINGS

Aspects, features, benefits and advantages of the embodiments described herein will be apparent with regard to the following description, appended claims, and accompanying drawings where:

DETAILED DESCRIPTION

Figure 1:
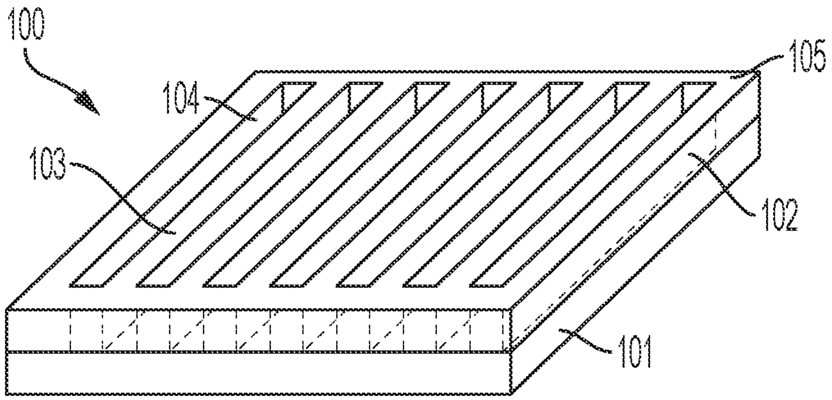
FIG. 1 is an isometric view of an embodiment of an unitary sorbent sheet with frame sections.

Before the present compositions and methods are described, it is to be understood that the subject matter herein is not limited to the particular processes, compositions, or methodologies described, as these may vary. It is also to be understood that the terminology used in the description is for the purpose of describing the particular versions or embodiments only, and is not intended to limit the scope of the present subject matter, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present subject matter, the preferred methods, devices, and materials are now described. All publications mentioned herein are incorporated by reference in their entirety. Nothing herein is to be construed as an admission that the subject matter is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth. Further, as used in this document, the term "comprising" means "including, but not limited to."

As used herein, the term "about" means plus or minus 10% of the numerical value of the number with which it is being used. Therefore, "about 50" means in the range of 45-55.

As used herein, the term "sorbent material" is meant to encompass all known materials from any source that are capable of adsorbing or absorbing liquids and/or gases. For example, sorbent materials include, but are not limited to, activated carbon, carbon nanotubes, graphenes, natural and synthetic zeolite, silica, silica gel, alumina, zirconia, and diatomaceous earths.

In the context of this application, a "sorbent material sheet" means a sheet made out of sorbent material.

In the context of this application, "unitary" means forming a single unit. "Unitary" can describe a product made of a single component. It can also describe a product made of multiple components that, together, are a single unit. Multiple components that form a unitary product need not be attached to one another, but can be. For example, two components that form a unitary product can be adhered together, such as with an adhesive layer. As another example, two components that form a unitary product can be arranged in proximity to each other but not attached to each other.

As used herein, descriptions and claims of multiple unitary sorbent sheets mean that there are multiple, separated sheets, with sides and/or surfaces in proximity to each other. Alternatively, descriptions and claims of multiple unitary sorbent sheets mean that there is only a single sheet, but that it has been wound or folded over on itself to yield a stacked, wound, or otherwise constructed mass of sheets with sides and/or surfaces in proximity to each other. The term also envisions that multiple unitary sorbent sheets are stacked together and then wound or otherwise folded over, forming alternating layers in a single mass.

In the context of this application, a "sorbent material sheet product" means a product that utilizes a unitary sorbent sheet. A sorbent material sheet product may be one unitary sorbent sheet. It may be multiple stacked unitary sorbent sheets. It may be one unitary sorbent sheet wound to form a cylinder. It may be multiple stacked unitary sorbent sheets that are then wound to form a cylinder. It may be several unitary sorbent sheets each formed into a cylinder having slightly different diameters from the next which can be arranged such that they from concentric rings in cross-section of a similarly sized cylinder. Further, a "sorbent material sheet product" can include additional features, such as a housing.

As used in the context of the sorbent or sorbent material or sorbent material sheets or unitary sorbent sheets or sorbent material sheet products, the term surface means the outer boundary of that individual component. Even more specifically, in the context of the unitary sorbent sheets, the term surface means the largest planar faces of the sheets, which when rolled or stacked face each other or themselves. In a sheet, the surface is the portion that is significantly larger than the thickness of the sheet.

As used herein, a fluid is a substance that flows continually under an applied shear stress. Fluids include liquids and gases and have zero shear modulus. The kinds of fluids are not limited and include organic compounds, aliphatic compounds, aromatic compounds, hydrocarbons, refrigerants, metals, noble gases, halogens (IUPAC Group 17), chalcogens (IUPAC Group 16), pnictogens (IUPAC Group 15), odor causing compounds, such as but not limited to those containing sulfur, and combinations of one or more of the above. The fluid may be a pure material or a mixture of materials. Examples of hydrocarbons include one or more of gasoline, alcohols including methanol, ethanol, and butanol, the simple hydrocarbons including methane, ethane, propane, butane, pentane, hexane, heptane, octane, nonane, decane, undecane, or dodecane, diesel fuel, kerosene, liquefied petroleum gas, natural gas, or synthetic fuels that approximate one or more of the above hydrocarbons derived from mineral deposits.

Embodiments are directed to devices containing one or more unitary sorbent sheets, sorbent material sheet products, and methods for making sorbent material sheet products and devices containing these sheets. In various embodiments, the sorbent material sheet products may be composed of a sorbent material and a binder and have a thickness of about 0.30 mm to about 2.5 mm. In some embodiments, the thickness is less than about 2 mm, or less than about 1 mm. The devices of various embodiments may include a housing and one or more unitary sorbent sheets. In some embodiments, the devices may have a void fraction of about 10% or more of the total volume of the housing.

Finally, some embodiments are directed to sorbent devices described in U.S. Pat. No. 10,807,034 B2 filed on Jan. 31, 2018, the entirety of which is hereby incorporated by reference.

Unitary Sorbent Sheets with Alternating Spaces and Strips

Disclosed herein are unitary sorbent sheets, cylindrical rolls of such sheets, methods and devices for making such sheets, sorbent material sheet products employing such sheets, and associated methods of making and using each of these.

FIG. 1 is an isometric view of an embodiment of an unitary sorbent sheet 100 with frame sections 105. The unitary sorbent sheet 100 comprises a substrate sheet 101 and a spacer sheet 102. The spacer sheet 102 may or may not be made from sorbent material. The substrate sheet 101 and the spacer sheet 102 may be adhered to one another via any means, including but not limited to mechanical, frictional, or chemical means. In some embodiments, adherence is not required. In some embodiments the substrate sheet 101 and the spacer sheet 102 are merely arranged touching each other.

The substrate sheet 101 may be any suitable sorbent material sheet such as described in more detail below. It may be smooth, textured, embossed, patterned or any combination of these. The substrate sheet 101 will have a thickness and dimensions corresponding to length and width.

Figure 2:
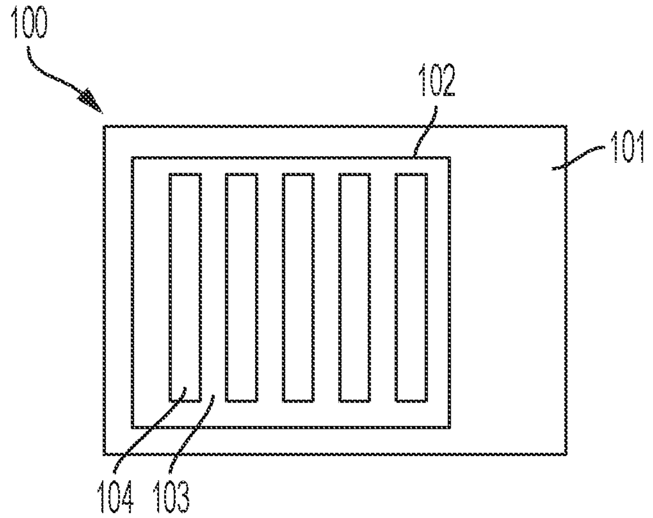
FIG. 2 is a top view of an embodiment of an unitary sorb ent sheet with a substrate sheet and spacer sheet having different dimensions.

The spacer sheet 102 may or may not be made from a sorbent material sheet. It may be made from the same sorbent material as the substrate sheet 101 or it may be made from another sorbent material. It may also be a foam. The spacer sheet 102 has a thickness and dimensions corresponding to length and width. The spacer sheet 102 thickness may be the same as or different from the thickness of the substrate sheet 101. As shown in FIG. 2, the length and width dimensions of the spacer sheet 102 may be the same as or different from those of the substrate sheet 101. In some embodiments, at least one of the dimensions are cut to the same size.

Referring back to FIG. 1, the spacer sheet 102 comprises a peripheral frame 105, consisting of opposed longitudinal sections and opposed lateral sections, and plurality of spacer strips 103 separated by a plurality of intervening spaces 104 such that the spacer strips 103 connect opposed longitudinal frame sections 105. Although the spacer strips 103 and intervening spaces 104 may be formed by any means, it is contemplated that the intervening spaces 104 be cut and removed from a solid material sheet, resulting in the alternating spacer strips 103 and intervening spaces 104.

The thickness of the spacer sheet 101 and the substrate sheet 102 are determined by the application needs. The thickness of the spacer sheet 102 determines the distance between adjacent portions of the substrate sheet 101, when the unitary sorbent sheet 100 is rolled together or where multiple unitary sorbent sheets 100 are layered on top of each other. In some embodiments, a thickness of the spacer sheet 102 is larger than a thickness of the substrate sheet 101. In some embodiments, a thickness of the spacer sheet 102 is the same as a thickness of the substrate sheet 101. In some embodiments, a thickness of the spacer sheet 102 is less than a thickness of the substrate sheet 101.

The substrate sheet 101 and the spacer sheet 102 are sized and aligned such that the peripheral edges line up to make a singular sheet of substantially similar dimensions. This may be accomplished by laying the spacer sheet 102 on top of the substrate sheet 101 and cutting the substrate sheet 102 to size. The substrate sheet 101 and the spacer sheet 101 may be adhered to one another by any suitable means, including but not limited to mechanical, frictional, chemical, or other means. Alternatively, they may not be adhered to each other at all. It is possible that subsequent layering or rolling operations provide sufficient adherence between the layers that no additional adhesive or technique is required. In some embodiments, such as when the sheets are rolled together within a flexible bag or pouch instead of a rigid canister, the sheets are adhered to each other by way of an adhesive that is deposited on one or more of the substrate sheets, one or more of the spacer sheets, or both the spacer sheets and the substrate sheets. The resulting unitary sorbent sheet 100 has one surface with the characteristics of the substrate sheet 101 and an opposite surface having raised portions with the characteristics of the spacer sheet 102 separated by lower portions revealing the substrate sheet 101 through intervening spaces 104 formed between spacer strips 103.

Figure 3:
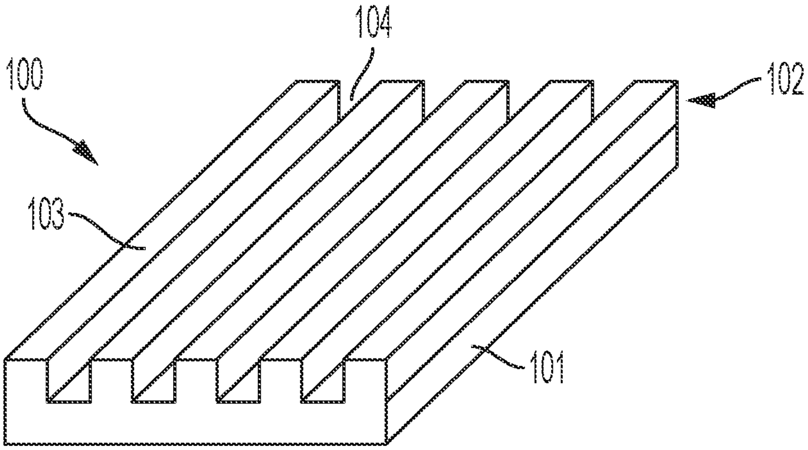
FIG. 3 is an isometric view of an embodiment of an unitary sorbent sheet without frame sections.

FIG. 3 is an isometric view of an embodiment of an unitary sorbent sheet 100 without frame sections 105. In some embodiments, the longitudinal frame sections 105 are removed, typically via a cutting operation. This allows fluid flow through the intervening spaces 104 between the spacer strips 103. In some embodiments, removal of the longitudinal sections may occur after the unitary sorbent sheet 100 is rolled.

Although FIG. 1 and FIG. 3 describe the spacer sheet 102 as including the plurality of spacer strips 103 separated by a plurality of intervening spaces 104, there are other layer structures which are contemplated in combination with this structure. For example, the spacer sheet 102 may include or be configured adjacent to at least one additional spacer sheet 102 which does not include any intervening spaces 104. Such as structure would be a substantially continuous layer, and would serve to add additional functionality or to adjust the dimensions of the unitary sorbent sheet 100.

Furthermore, whether the spacer sheet 102 is made from sorbent material or is not made from sorbent material, the spacer sheet 102 may be formed as a foam. When such spacer sheets are formed as a foam, that foam can be an open-cell foam (which allows fluid to pass through the foam) or a closed-cell foam (which does not allow fluid to pass through the foam). Open cell foams allow fluids to easily pass through them, while closed cell foams generally impede the through flow of fluids because the pores contained within the foam are closed. In one such embodiment, the unitary sorbent sheet 100 includes a substrate sheet 101, substantially continuous spacer sheet 102 that is formed of a foam, and a discontinuous spacer sheet 102 that is formed of spacer strips 103 separated by a plurality of intervening spaces 104. The inclusion of open cell foams, closed cell foams, or both can be used to alter the flow of fluids through the unitary sorbent sheet 100 or to alter the overall dimensions of the sheet. The foams can be configured to have sorbent properties or the forms can be configured to not have sorbent properties. When the foams are configured to have sorbent properties, this can be internally (for example, the material includes blended sorbent such as activated carbon) or externally (for example, a form includes a sorbent such as activated carbon that is added to the surfaces of the pores).

Figure 4:
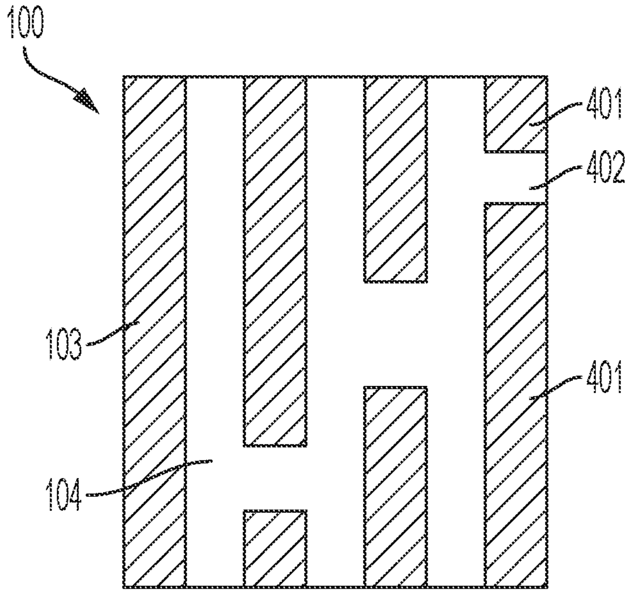
FIG. 4 is a top view of an embodiment of an unitary sorbent sheet with sub-strips.

FIG. 4 is a top view of an embodiment of an unitary sorbent sheet 100 with sub-strips 401. In some embodiments, it is desirable to create alternative pathways to alleviate problems with clogging. In exemplary embodiments, one or more spacer strips 103 may be bifurcated, essentially forming two sub-strips 401 creating a cross-channel 402 connecting the intervening spaces 104 on either side of the spacer strip 103. In some embodiments, a spacer strip 103 may be divided into two or more sub-strips 401 creating one or more cross-channels 402. While the cross-channels shown in FIG. 4 are perpendicular to the intervening spaces 104 on either side of the spacer strip 103, it is understood that the cross-channels 402 are not so limited. For example, the cross-channels 402 can be can be one or more of angled, curving, tapered, or straight, each of these which can add or remove from the tortuosity, and therefore the pressure drop, of a fluid that flows through the pathways. The cross-channels 402 can be parallel to each other, or in other embodiments the orientation of the cross-channels 402 is patterned so that they are not parallel to each other. In still further embodiments, the cross-channels 402 are randomly oriented so that there is no long-range order.

The unitary sorbent sheet 100 can be used as a unitary sorbent sheet 100 in the sorbent material sheet products and embodiments described further below, such as in flat sheet arrangements, curved sheet arrangements, or in spiral wound cylinders. Regardless, the spacer sheets 102 of the unitary sorbent sheets 100 create a uniform distance between adjacent substrate sheets 101, whether that is between multiple unitary sorbent sheets 100 stacked in a flat orientation, or between adjacent portions of the same unitary sorbent sheet 100 as is the case in wound orientations.

The unitary sorbent sheets 100 may be configured together in a variety of ways depending on the physical space that they must conform to, the required device performance, and the features which are included in proximity to the unitary sorbent sheets 100. In some embodiments, the unitary sorbent sheets 100 may be include holes, perforations, apertures, raised portions, depressed portions, or other surface textures or features to increase the surface area of the unitary sorbent sheet that is exposed to the passing fluid, therefore increasing performance for a given total sheet surface area. The various features or textures can also be sized and placed to make way for internal and external features, such as fluid channels, tubing, sensors, and valves. The unitary sorbent sheets 100 may take a variety of forms, such as a spiral wrapped configuration in either a cylindrical or elliptical form. They may also be in the form of an "S" shape, or a convex or concave "C" shape depending on the required device dimensions and/or any other required internal or external features. The unitary sorbent sheets 100 may also be stacked in a flat or curved configuration, and the stacked unitary sorbent sheets may be square, rectangular, circular, oval, or other irregular shape as needed to fit the space intended. This, in combination with the housing features discussed below, enables devices formed from the unitary sorbent sheets 100 to fit in smaller, more irregularly shaped spaces than prior art canister devices, which maximizes vehicle interior space.

To control the amount of fluid and the adsorption kinetics of fluid that moves through the unitary sorbent sheets 100, the pressure drop must be precisely controlled to a predetermined specification. As used herein, the pressure drop is the difference in the total pressure between two points along a flow path of fluid that passes through the unitary sorbent sheets 100. While not wishing to be bound by theory, the pressure drop relates to the adsorption performance of the carbon sheets because it controls the contact of fluid that moves through the unitary sorbent sheets 100. The pressure drop is affected by variables including but not limited to fluid flow rate, the thickness, spacing, surface area, bend radius, bend shape, length, presence of apertures, and surface features, of the unitary sorbent sheets 100. The pressure drop is also affected by the characteristics such as the viscosity or density of fluid that passes through the unitary sorbent sheets 100. The control of pressure drop within the unitary sorbent sheets 100 or in an overall device is therefore an important factor in the function of the unitary sorbent sheets 100 or the overall device.

Unitary sorbent sheets 100 wound in spirals or stacked, as discussed herein, can be difficult to tune for pressure drop. Controlling the tension on a wound spiral or the pressure on a stack of sheets must be carefully and reproducibly done via winding or stacking techniques. However in some situations, the pressure drop requirements are not easily met by these methods. Because of this, alternative techniques for controlling the pressure drop are required for those embodiments where the tension of the winding or the pressure of a stack are insufficient. The use of spacer strips 103, particularly spacer strips 103 of predictable dimensions achieved by using a cutting die as described herein permits easier fine tuning of pressure drop by changing size of spacer strips 103 or spacing between each spacer strip 103. The use of such spacer strips 103 also allows for more consistent production of sorbent material sheet products, filters, and devices employing the techniques and structures disclosed herein.

In addition to pressure drop, other design considerations include using sorbents with different properties in a succession of volumes or chambers in order to impart the ideal conditions for fuel tank evaporative loss applications.

Sorbent material sheet product performance can be improved by the addition of materials prior to or during sheet processing. These materials can provide beneficial properties such as enhanced porosity to reduce pressure drop; adsorption of inorganic vapors such as $H_2S$ or other undesirable gases. Alternatively, different sorbent materials can be processed simultaneously into a single unitary sorbent sheet 100 with distinct sections or a performance gradient from one side of the unitary sorbent sheet 100 to the other. For example, in an evaporative loss canister, a unitary sorbent sheet 100 could have high butane working capacity ("BWC") (which is a one measure of adsorbing butane), high BWC on one side and low BWC and on the other, allowing vapor emissions from fuel tanks to pass through different performing materials as the vapors move through one part of the unitary sorbent sheet 100, or stack of unitary sorbent sheets, or spiral-wound unitary sorbent sheet, to the other.

In addition to the designs and techniques described herein, the sorbent material itself may be modified with additives to the mixture prior to or during processing into unitary sorbent sheets 100, which, upon further processing (e.g. thermal or chemical), creates porosity or other features or characteristics in the sheets. This provides another method to control pressure drop.

Examples of additives that could provide porosity or other properties include, but are not limited to, foam-like polymer additives; water-soluble polymers, which could be rinsed to leave behind pores; friable materials with particle size greater than the intended unitary sorbent sheet 100 thickness, which would break up and leave behind pores, materials that are thermally labile so that the unitary sorbent sheet 100 can be heated and the added materials vaporize, producing pores in the unitary sorbent sheets 100, and other similar processes that could impart a controlled porosity within the unitary sorbent sheets 100. Any of these may be used alone or in combination. An alternative enhancement to unitary sorbent sheet 100 production is to process unitary sorbent sheets 100 such that two or more sorbents with different properties are included in a single unitary sorbent sheet 100 but are segregated along the width of the sheet. For example, a high BWC sorbent could be used in the same unitary sorbent sheet 100 with a low BWC sorbent, such that the vapors from fuel tank emissions would contact the high BWC sorbent ahead of the low BWC sorbent, within a single chamber. That is, in some embodiments, low and high BWC sorbents could be homogeneously mixed, or in some embodiments, there could be distinct sections of low or high BWC sorbents as desired.

Another example is a high BWC sorbent for adsorption of butane, included with a sorbent that would remove $H_2S$ or other undesirable vapors that are not normally well removed by a high BWC activated carbon, for example.

The size, shape, spacing and distribution of the spacer strips 103 may each be chosen to achieve a desired outcome. The spacer strips 103 may be of uniform width or may be of different widths. The width may increase or decrease as one moves along the length of the spacer sheet 102. The spacer strip 103 width may be random, or seemingly random, or repeated in a known pattern. The same is true of the intervening spaces 104 between the spacer strips 103. Further, the substrate sheet 101 and the spacer sheet 102 (and thus the spacer strips 103) may be of the same or different material. As discussed further below, although a spacer strip 103 of sorbent material has some advantages, the spacer sheet 102 may be made of other materials.

Manufacturing Methods

The disclosure provides methods of manufacturing sorbent material sheet products. The methods of the disclosure offer numerous advantages over prior art processes including increased production rates and uniform and more precisely controlled sorbent material sheet products.

Figure 5:
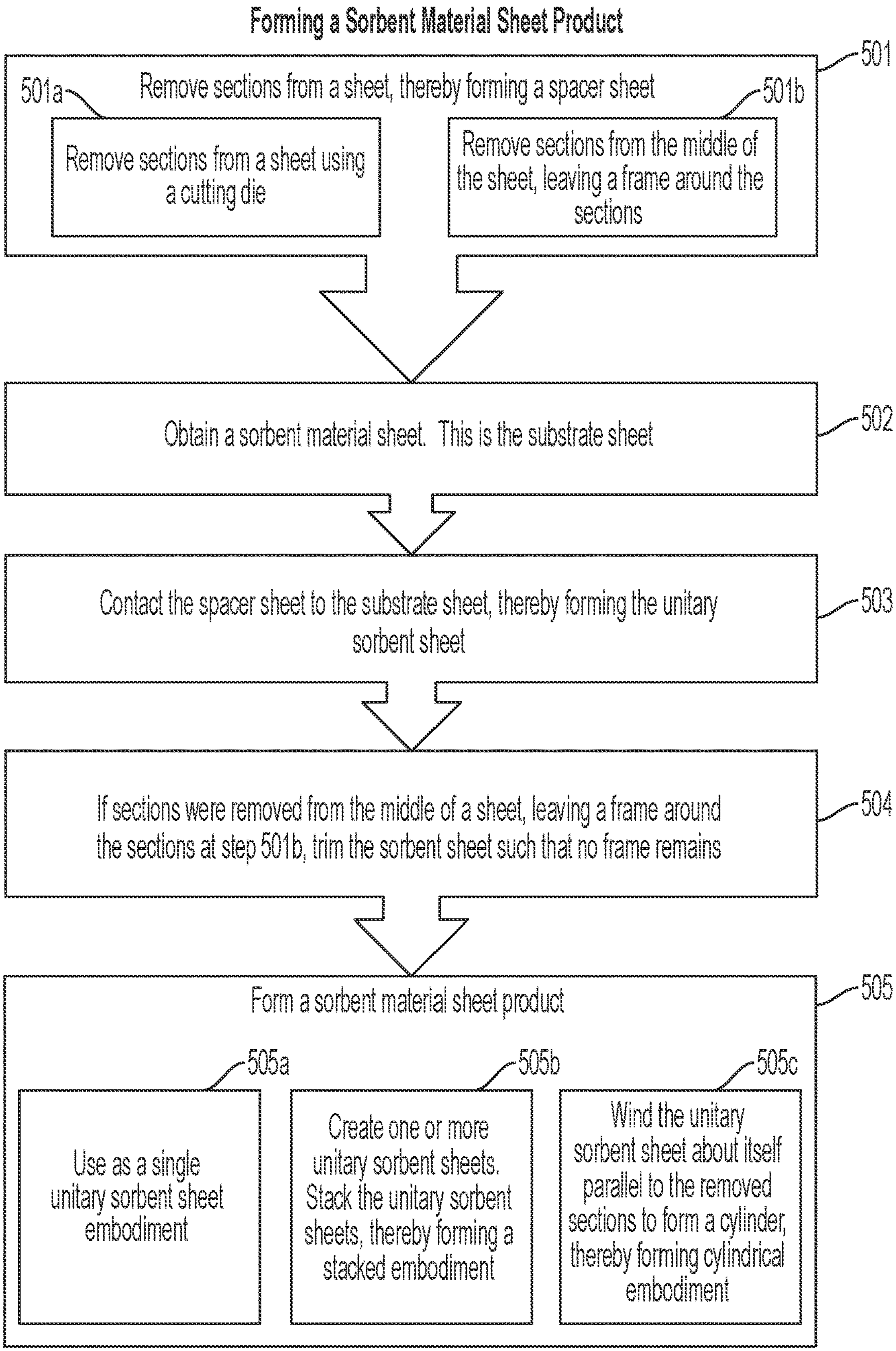
FIG. 5 is a block diagram of a method of making a sorbent material sheet product.

FIG. 5 is a block diagram of a method of making a sorbent material sheet product. At step 501 sections are removed from a sheet, thereby forming a spacer sheet 102. To perform this step, first, a sheet is provided and placed on a location. The location is not limited. In some embodiments, the location does not move and it is a stationary surface. In other embodiments, the location is in motion, such as a substrate roller. It is understood that the sheet can be a single sheet or may comprise multiple individual sheets. Then, the sections are removed from the sheet.

Applicants previously attempted to form the spacer strips 103 and intervening spaces 104 via a manual cutting operation. While this is a possibility, it is labor intensive, and results in inconsistent dimensions. A cutting die was therefore created for the desired cutting dimensions and operation. The cutting die generally comprises a cutting material, such as metal, capable of cleanly and quickly cutting through the sorbent material. The cutting portions are raised and define the dimensions of the spacer section, or spaces. The cutting die has multiple cutting sections separated by recessed sections to leave the strip sections and frame sections untouched. The cutting die can be moved along the length of the sheet to achieve any desired length. The cutting die may also be sized such that a single cutting operation cuts the material from the entire sheet needed for a desired application. That is, if the desired dimensions of the unitary sorbent sheet 100 is three feet by 1 foot (or 0.91 meter by 0.30 meter), a single cutting die could be developed with that dimension in mind. Such cutting dies would be suitable for batch operations in a press-type machine. Alternatively, for continuous cutting operations, the cutting die could be designed as a rotary tool where the cutting die rolls over the material, cutting as it goes.

Therefore, in some embodiments, sections are removed from the sheet using a cutting die, as shown in optional step 501*a*. When using a cutting die, a cutting die is contacted with the sheet. The cutting die includes one or more cutting blades or cutting dies which are capable of passing through one or more sheets of the first material sheet. When the cutting die passes through one or more sheets of the sheet, a pattern of material is removed from the one or more sheets of the sheet to thereby form a spacer sheet 102.

In some embodiments, sections are removed from the middle of the sheet, leaving a frame 105 around the removed sections, as shown in optional step 501*b*.

At step 502, a sorbent material sheet is provided. This sorbent material sheet becomes the substrate sheet 101. At step 503, the spacer sheet 102 is placed on the sorbent material sheet, thereby forming an unitary sorbent sheet 100.

The placement of the spacer sheet 102 on the substrate sheet 101 is not limited. In some embodiments, the placement is on a single web or conveyor as a moving or stationary substrate. In other embodiments, a roll to roll placement moves the spacer sheet 102 to the substrate sheet 101.

The spacer sheet 102 and the substrate sheet 101 may be adhered to one another through the layering process, via the weight of the roller, or through chemical (e.g. adhesive)

application, or via other means. Alternatively, they may not be adhered at all. Rather, they may be arranged such that they contact each other.

In some embodiments, step 504 is performed. Step 504 may be performed if optional step 501*b* was performed. In other words, step 504 may be performed if sections were removed from the middle of the sheet leaving a frame 105 around the removed sections. At step 504, the unitary sorbent sheet 100 is trimmed to remove the frame 105.

Figure 6:
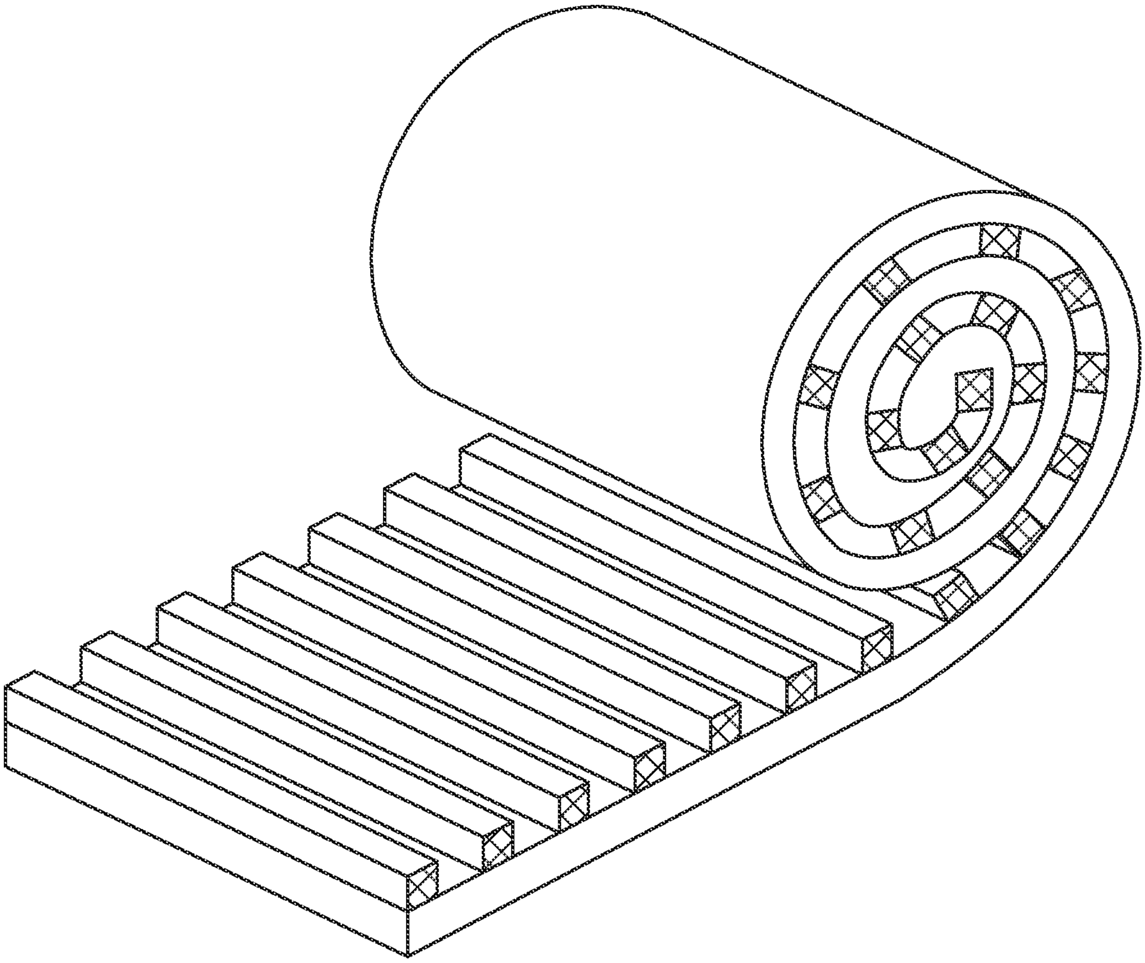
FIG. 6 shows an embodiment of a unitary sorb ent sheet being wound into an embodiment of a wound sorbent material sheet product.

At step 505, a sorbent material sheet product is formed. In some embodiments, a sorbent material sheet product comprises a single unitary sorbent sheet 100, as in step 505*a*. In other embodiments, step 505*b* is performed. At step 505*b*, one or more unitary sorbent sheets 100 are created and then stacked to create a stacked sorbent material sheet product. Alternatively, a stacked sorbent material sheet product may be formed as a bi-layer of substrate sheets 101 and spacer sheets 102. In yet other embodiments, step 505*c* is performed. At step 505*c*, the unitary sorbent sheet 100 is wound about itself parallel to the removed sections to form a cylinder to create a wound sorbent material sheet product. An example of step 505*c* is shown in FIG. 6. In the end, at least one unitary sorbent sheet 100 emerges for further inclusion in the sorbent material sheet products described herein.

The Sorbent Material Sheets

The substrate sheet 101, the spacer sheet 102, or both the substrate sheet 101 and the spacer sheet 102 may be made from sorbent material sheets. The sorbent material sheets may include any of the sorbent materials described above including, but not limited to, activated carbon, carbon nanotubes, graphenes, natural and synthetic zeolite, silica, silica gel, alumina, zirconia, and diatomaceous earths, and in certain embodiments, the sorbent material sheets may be composed of activated carbon. The sorbents may be used alone or in combination. Either one or both of the sorbent material sheets can have no porosity or substantially no porosity, pores having closed cells, or pores having open cells. In certain materials, one or more of the substrate sheet 101 or the spacer sheet 102 is positioned adjacent to, in contact with, or enveloped by a reinforcing material that does not adsorb any compounds, and is instead included as a mechanical reinforcement. Examples of such materials include aluminum, steel, and other metals, or rigid polymers.

The activated carbon may be of various grades and types selected based on performance requirements, cost, and other considerations. The activated carbon may be granular from reagglomerating a powder, granular from crushing or sizing nutshells, wood, coal or pellets created by extrusion, or activated carbon in powdered form. The activated carbon may be formed by processes of carbonization and activated. The raw material, such as wood, nutshell, coal, pitch, etc. is oxidized and devolatized, with steam and/or carbon dioxide gasified to form the pore structure in the activated carbon which is useful for adsorption. The initial oxidation and devolatilization process may include a chemical treatment with a dehydrating chemical, such as phosphoric acid, sulfuric acid, sodium hydroxide, potassium hydroxide, and combinations of those.

A variety of activation processes are known in the art. The most useful processes for providing activated carbon for the sorbent material sheets involve a step of providing wood and/or wood byproduct, acid treating the wood and/or wood byproducts by exposure to phosphoric acid, and carbonizing the wood and/or wood byproducts using steam and/or carbon dioxide gasification. This process results in activated carbon particles having the highest butane working capacity ("BWC"), which is a measure of activated carbon performance. More details of the BWC testing and results are described in the Examples.

The activated carbon may be formed from materials including bagasse, bamboo, coconut husks, peat, wood such as hardwood and softwood sources in the form of sawdust and scrap, lignite, synthetic polymers, coal and coal tar, petroleum pitch, asphalt and bitumen, corn stalks and husks, wheat straw, spent grains, rice hulls and husks, nutshells, and combinations thereof.

The sorbent material sheets may further include one or more binders. Embodiments are not limited to particular binders, which can include polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The binders can be thermoplastic or thermosetting as conditions require, and can include mixtures of thermoplastic and thermosetting compounds.

The amount of binder may be about 1% to about 30% by weight of the total composition, and in certain embodiments, the amount of binder may be about 1% to about 20% by weight or about 2% to about 10% by weight of the total composition, or any individual amount or range encompassing these example amounts. The binder may be present in the amount of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 25%, about 30%, about 35%, about 40% or any range made of any two or more of the above amounts, all of which are measured by weight of the total composition. In some embodiments, the sorbent material sheets may include a solvent, which may generally be present in small, residual, amounts of, for example, less than 10%, less than 5%, or less than 2% and greater than about 0.1% or 0.2% by weight. In particular, in some embodiments the sorbent material sheets may have no (0%) solvent.

In some embodiments, the sorbent material sheets have a thickness of less than about 2.5 mm, less than 2.3 mm, less than about 2 mm, less than about 1.8 mm, less than about 1.6 mm, less than about 1.4 mm, less than about 1.2 mm, less than about 1.0 mm, about 0.01 mm to about 2 mm, about 0.01 mm to about 1.8 mm, about 0.1 mm to about 1.6 mm, about 0.01 mm to about 1.4 mm, about 0.01 mm to about 1.2 mm, about 0.01 mm to about 1.0 mm, about 0.02 mm to about 0.90 mm, about 0.05 to about 0.95 mm, about 0.05 to about 0.90 mm, about 0.30 mm to about 2.5 mm or any individual thickness or range encompassed by these example ranges or listed as an endpoint. The sorbent material sheets of various embodiments may have a density of about 0.05 $g/cm^3$ to about 2.0 $g/cm^3$, and in other embodiments, the sorbent material sheets may have a density of 0.08 $g/cm^3$ to about 1.5 $g/cm^3$, about 0.1 $g/cm^3$ to about 1.3 $g/cm^3$, or any density or range encompassed by these example ranges. The density is calculated first by measuring the thickness of a given square or circular piece of sheet with a micrometer, multiplying by the surface area to obtain the volume, and weighing the piece to obtain the density (weight/volume). In certain of these embodiments, the sorbent materials sheets have elevated amounts of binder, such as 20 wt. %, 25 wt. %, 30 wt. %, 35 wt. %, or 40 wt. %, or any range made of one or more of the preceding values as endpoints. Such embodiments are considered more rigid than counterpart embodiments having less binder. Alternatively, the sheets can be made thicker to impart additional strength, or separate layers of, for example, a metal foil or metal tube can be formed and contacted with the sorbent material sheets to impart strength to the sorbent material sheets.

As was described above, one or more separate reinforcing layers can be incorporated into or surround the overall arrangement of the sorbent material sheet(s). The primary function of the one or more reinforcing layers is to increase the physical durability or strength of the unitary sorbent sheet 100 or the overall sorbent material sheet products. The way that the reinforcing layers increases the strength depends on the selected materials and orientation of those materials that form the reinforcing layer. The reinforcing layer can in some instance increase the overall tensile strength of the unitary sorbent sheet or the sorbent material sheet as it is assembled into, for example, a wound sorbent material sheet product. Additionally or in the alternative, the reinforcing layer can prevent the sorbent material sheet product or the sorbent sheets themselves from being crushed or squeezed in such a way that be detrimental to their functioning or durability. In general the reinforcing materials that form the reinforcing layers do not have sorbent properties and will not perform as sorbents. However, the disclosure contemplates that in some embodiments, the reinforcing layer can have sorbent material incorporated to add some sorbent functionality. For example, the reinforcing material can in some embodiments include a sorbent such as powdered activated carbon.

The one or more reinforcing layers are not particularly limited. The reinforcing material can be in the form of a sheet having no pores, a sheet having pores, a netting, a mesh, an open cell foam, or a closed cell foam. The reinforcing sheet can be layered along with other layers in the overall unitary sorbent sheet 100 or the sorbent material sheet product. Examples of materials for the reinforcing layer include aluminum, steel, titanium, and other metals, or rigid polymers.

The BWC for each sorbent material sheet may be greater than about 7 g/100 $cm^3$, and in some embodiments, the BWC may be from about 7.0 g/100 $cm^3$ to about 30 g/100 $cm^3$, about 8.0 g/100 $cm^3$ to about 25 g/100 $cm^3$, about 10 g/100 $cm^3$ to about 20 g/100 $cm^3$, about 10 g/100 $cm^3$ to about 15 g/100 $cm^3$, about 11 g/100 $cm^3$ to about 15 g/100 $cm^3$, about 12 g/100 $cm^3$ to about 15 g/100 $cm^3$ or any individual BWC or range encompassed by these example ranges. In other examples, the BWC may be about 9 g/100 $cm^3$ to about 20 g/100 $cm^3$, about 12 g/100 $cm^3$ to about 20 g/100 $cm^3$, about 13 g/100 $cm^3$ to about 20 g/100 $cm^3$, about 14 g/100 $cm^3$ to about 20 g/100 $cm^3$, or about 15 g/100 $cm^3$ to about 20 g/100 $cm^3$. It is also contemplated that any of the endpoints of the above ranges may be combined to form new and distinct ranges.

The sorbent material sheets have higher performance as measured by the BWC than conventional sorbent materials which are provided in powders or other particulate forms.

The sorbent material sheets can be made by any suitable process. In some embodiments, sorbent material sheets can be made by pulverizing granular or pelletized sorbent material to a powder, mixing the powder with a binder to form a mixture, heating and blending the mixture, and rolling the mixture to form the sorbent material sheet. The step of pulverizing may produce sorbent particles having an average particle diameter of about 0.001 mm to about 0.2 mm, about 0.005 mm to about 0.1 mm, about 0.01 mm to about 0.075 mm, or any individual particle diameter or range encompassed by these example ranges, and in certain embodiments, the pulverized sorbent particles may have an average particle diameter of about 0.001 mm to about 0.01 mm. The step of mixing the powder with a binder may include mixing the sorbent particle powder with about 2% to about 10%, about 2% to about 20%, about 2% to about 30%, about 2% to about 40% by weight binder of the total composition, or any individual amount or range encompassed by these example ranges. Heating can be carried out at any temperature sufficient to remove residual solvent such as, for example, about 50° C. to about 200° C.

The sorbent material sheet may include various distributions of different sized particles to increase the packing efficiency of the powder within the sorbent material sheets. The selection of different sized particles can also improve rheological properties of the powder and surrounding binders, which allows improved mixing and uniform particle distribution before formation of the sorbent material sheets. In some embodiments, the particles of the sorbent material sheet may have a single particle size distribution, and in other embodiments, the particles may have two different particle size distributions. In further embodiments, the particle may have at least three different particle size distributions.

The mean particle sizes of at least two different particle populations, each having a particular size distribution, may be selected so that they have a ratio of between about 1:1 and about 1:15. In other embodiments, the mean particle sizes of the two different particle populations may have a ratio of about 1:2 to about 1:10. The mean particle sizes may also have a ratio of about 1:2 to about 1:5, or combinations of any of the above listed ratios.

The sorbent material sheets have significantly higher sorbent capacity than prior art fuel vapor recovery canisters for a given volume and weight. This capability can be utilized in various ways. In some embodiments, the sorbent material sheets can provide enhanced pollution controls in jurisdictions where such high levels of control are required. In other embodiments, the overall size, cost, and weight of the ORVR can be reduced for a specific level of performance. In further embodiments, an ORVR adsorption device can be designed which has increased performance over conventional adsorption canisters, thereby allowing the designer to omit costly and complex returnless fuel pump systems which would otherwise be required to reduce evaporative emissions. Higher performance adsorption devices may also render active condensing vapor systems unnecessary, which avoids the size, weight, and cost of compressor pumps and condensate storage tanks. It should be understood, however, that the ORVR adsorption device using the sorbent material sheets can also be combined with these devices for exceptionally high performance and a minimal size, weight, and cost penalty over conventional systems.

Sorbent Material Sheet Product

The unitary sorbent sheets 100 described above can be used as sorbent material sheet products alone or combined as a stacked or wound embodiments. The combination of the unitary sorbent sheets 100 takes advantage of one or more of the above described features, such as increased surface area/volume ratio, reduced void space, improved sorbent performance, etc. In general, the unitary sorbent sheets 100 are arranged next to each other to form a sorbent material sheet product made of unitary sorbent sheets 100 that are stacked, rolled, wound, folded, and/or laminated such that the surfaces of the unitary sorbent sheets 100 are in close proximity to, or adjacent to each other. Whatever the arrangement, the goal is to maximize the surface area of the unitary sorbent sheets 100 exposed to the vapor, fluid, and/or gas stream and thus the performance of the sorbent material sheet product.

Figure 7:
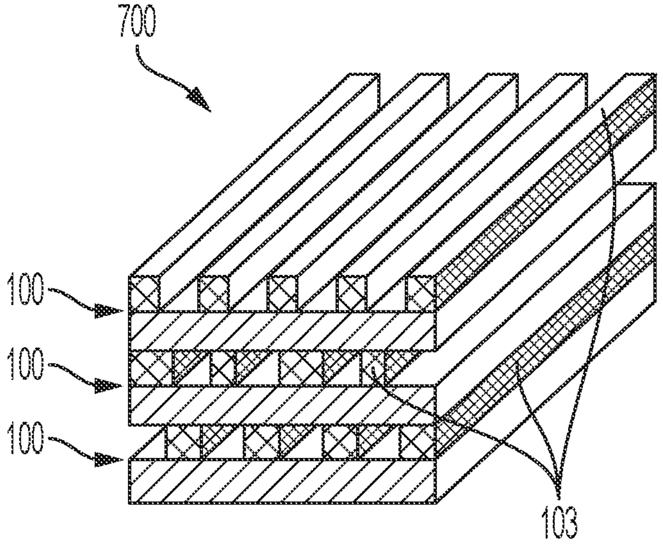
FIG. 7 is an isometric view of an embodiment of a stacked sorbent material sheet product made of stacked unitary sorbent sheets.

Stacked Sorbent Material Sheet Product:

FIG. 7 is an isometric view of an embodiment of a stacked sorbent material sheet product 700 made of stacked unitary sorbent sheets 100. The stacked sorbent material sheet product 700 comprises two or more unitary sorbent sheets 100 each defining an upper surface and a lower surface, and having a known combined total surface area, wherein each unitary sorbent sheet 100 comprises a sorbent material and a binder, where adjacent unitary sorbent sheets 100 are stacked and arranged such that adjacent upper and lower surfaces are substantially congruent with each other, and aligned to allow fluid flow at least between adjacent upper and lower surfaces.

Performance improvements of the stacked sorbent material sheet product 700 can be measured as the performance of the product having a given amount of activated carbon versus the performance of that same amount and grade of activated carbon if provided within a canister in a pelletized or powdered form. In some embodiments, the stacked sorbent material sheet product 700 has a BWC that is about 3% higher, about 5% higher, about 7% higher, about 9% higher, about 10% higher, about 12% higher, about 14% higher, and about 16% higher than the same volume and grade of activated carbon within a canister in pelletized or powdered form. Ranges based on these amounts are also contemplated, such as performance that is between about 5-14% higher, between about 5-10% higher, between about 10-16% higher, and so forth.

It should be noted that these improvements are only measured as between the volumes of the pelletized or powdered activated carbon and the stacked sorbent material sheet product 700, without accounting for other improvements of the stacked sorbent material sheet product 700. One key difference, described above, is the omission of a rigid canister body that would otherwise be required. The omission of the rigid canister body, which is needed in prior art systems involving pelletized or powdered activated carbon because the loose activated carbon cannot support itself, drives weight savings.

In some embodiments where the stacked sorbent material sheet product 700 is used in a main chamber, the stacked sorbent material sheet product 700 has a BWC at least 10% higher than the BWC of a pelletized/powdered form of the same amount by volume of the stacked sorbent material sheet product 700. In such main chamber embodiments, the stacked sorbent material sheet product 700 has a BWC greater than about 10 g/100 $cm^3$. In some embodiments, where the stacked sorbent material sheet product is to be used in a scrubber or a main chamber, it has a BWC of about 1.0 g/100 $cm^3$ to about 10.0 g/100 $cm^3$, about 3.0 g/100 $cm^3$ to about 10.0 g/100 $cm^3$, about 5.0 g/100 $cm^3$ to about 10.0 g/100 $cm^3$, about 1.0 g/100 $cm^3$ to about 20 g/100 $cm^3$, about 3.0 g/100 $cm^3$ to about 20 g/100 $cm^3$, about 5.0 g/100 $cm^3$ to about 20 g/100 $cm^3$, about 7.0 g/100 $cm^3$ to about 20 g/100 $cm^3$, or greater than about 12 g/100 $cm^3$, or greater than about 13 g/100 $cm^3$, or greater than about 14 g/100 $cm^3$, or greater than about 15 g/100 $cm^3$. Ranges are also contemplated, such as about 10-20 g/$cm^3$, about 10-12 g/100 $cm^3$, about 10-14 g/100 $cm^3$, about 12-14 g/100 $cm^3$, about 12-15 g/100 $cm^3$, and about 15-20 g/100 $cm^3$.

It should be noted that consistent with the description above, the stacked sorbent material sheet product 700 can be configured for inclusion in a main chamber or in a scrubber. When configured for a main chamber, the sorbent material sheet product 700 has a high overall BWC, such as about 10.0 g/100 $cm^3$ to about 20 g/100 $cm^3$, or greater than about 12 g/100 $cm^3$, or greater than about 13 g/100 $cm^3$, or greater than about 14 g/100 $cm^3$, or greater than about 15 g/100 $cm^3$, about 10-20 g/$cm^3$, about 10-12 g/100 $cm^3$, about 10-14 g/100 $cm^3$, about 12-14 g/100 $cm^3$, about 12-15 g/100 $cm^3$, or about 15-20 g/100 $cm^3$. When configured for a scrubber, the sorbent material sheet product 700 has a low overall BWC, such as about 1.0 g/100 $cm^3$ to about 10.0 g/100 $cm^3$, about 3.0 g/100 $cm^3$ to about 10.0 g/100 $cm^3$, about 5.0 g/100 $cm^3$ to about 10.0 g/100 $cm^3$, or any value falling within one of those ranges. The main chamber has a higher overall adsorptive capacity than the scrubber, but the main chamber and scrubber may have other properties that are the same or different depending on the design requirements, the materials selected, or both.

The unitary sorbent sheets 100 are held in a spaced apart relationship by the spacer strips 103. That arrangement controls one or more of void volume, flow rate, pressure drop, and other characteristics.

Each unitary sorbent sheet 100 defines opposed lateral edges which are substantially parallel to fluid flow. The congruent lateral edges of adjacent unitary sorbent sheets 100 may be separate from each other, bound together or some combination thereof. In this manner, the edges of the stacked sorbent material sheet product 700 may be sealed, partially sealed, or unsealed. The sealed or unsealed nature can be chosen to achieve desired results such as modifying fluid flow rate and/or patterns or other properties.

In some embodiments, the stacked sorbent material sheet product 700 yields a void volume of about 10% or less. In some embodiments, the void volume is about 8% or less, in some embodiments, the void volume is about 6% or less, in some embodiments, the void volume is about 4% or less. In some embodiments, the stacked sorbent material sheet product 700 yields a void volume of about 10% or more, about 12% or more, about 14% or more, about 15% or more, about 16% or more, about 17% or more, about 18% or more, about 19% or more, about 20% or more, about 21% or more, about 22% or more, about 23% or more, about 24% or more, about 25% or more, about 26% or more, about 27% or more, about 28% or more, about 29% or more, or about 30% or more, or any range formed by combining the above ranges. In some embodiments, the stacked sorbent material sheet product 700 yields a void volume of about 10%, about 12%, about 14%, about 15%, about 16%, about 17%, about 18%, about 19%, about 20%, about 21%, about 22%, about 23%, about 24%, about 25%, about 26%, about 27%, about 28%, about 29%, or about 30%, or any range formed by combining the above ranges. In some embodiments, the stacked sorbent material sheet product 700 yields a void volume of about 10-15%, about 15-20%, about 20-25%, about 25-30%, or about 30-35%.

In some embodiments, each unitary sorbent sheet 100 has a density of about 0.08 g/$cm^3$ to about 1.5 g/$cm^3$.

In some instances, the stacked sorbent material sheet product 700 comprises at least two populations of sorbent material particles, wherein each of the at least two populations have different average particle diameters. See the above description of the bimodal particle size distribution which was discussed with respect to the individual sorbent material sheets. The same distribution ratios as between populations of sorbent particles are contemplated with respect to product formed of multiple unitary sorbent sheets 100. In some instances, the density of the sorbent material particles achieved by the at least two populations is greater than the density achieved by either population alone. The inclusion of a bimodal particle size distribution can also be used to improve the mechanical properties of the sorbent material sheet product because it makes the polymeric sheets much more resistant to shear forces.

In some instances, a stacked sorbent material sheet product 700 is made of at least two unitary sorbent sheets 100, each of which has a defined upper surface and lower surface which have a combined total surface area, and wherein each unitary sorbent sheet 100 is made of a sorbent material and a binder, and wherein each unitary sorbent sheet 100 is stacked and arranged such that adjacent upper and lower surfaces of the multiple unitary sorbent sheets 100 are substantially parallel and are aligned to allow fluid flow at least between the adjacent upper and lower surfaces.

The term substantially parallel as used in the context of a stacked sorbent material sheet product 700 means that the unitary sorbent sheets 100 maintain substantially the same distance apart over their entire area, but with exceptions made for various physical characteristics and features. These exceptions that still fall within the scope of substantially parallel include but are not limited to differences due to variations in components such as spacers, sensors, apertures, tubing, ports, valves, channels, corrugations, pleats, folds, deformation encountered during manufacturing or operation, deformation due to the shape or pressures applied by or through the external housing, different wrapping techniques such as to seal the peripheries of the sheets, and so forth.

In some embodiments, the stacked sorbent material sheet product 700 has a BWC value about 5%, about 10%, about 15%, about 20%, about 25%, about 30%, about 35%, about 40%, about 45%, or about 50% higher than the BWC of the same volume of sorbent material in pelletized or powdered forms. These can also be combined to form ranges, for example, between about 5-25% higher than the BWC of the same volume of sorbent material in pelletized or powdered forms. In some embodiments, the stacked sorbent material sheet product 700 has a BWC value at least about 5%, at least about 10%, at least about 15%, at least about 20%, at least about 25%, at least about 30%, at least about 35%, at least about 40%, at least about 45%, or at least about 50% higher than the BWC of the same volume of sorbent material in pelletized or powdered forms.

In certain alternative embodiments, the stacked sorbent material sheet product 700 has a BWC value that is not higher than the BWC value of the same volume of sorbent material in powdered or pelletized forms. In such embodiments, the stacked sorbent material sheet product 700 has a BWC value about 5%, about 10%, about 15%, about 20%, about 25%, about 30%, about 35%, about 40%, about 45%, or about 50% lower than the BWC of the same volume of sorbent material in pelletized or powdered forms. These can also be combined to form ranges, for example, between about 5-25% lower than the BWC of the same volume of sorbent material in pelletized or powdered forms. In some embodiments, the stacked sorbent material sheet product 700 has a BWC value more than about 5%, more than about 10%, more than about 15%, more than about 20%, more than about 25%, more than about 30%, more than about 35%, more than about 40%, more than about 45%, or more than about 50% lower than the BWC of the same volume of sorbent material in pelletized or powdered forms. As used in the preceding sentence, the phrase "more than about . . . % lower than the BWC of the same volume of sorbent material" means that the percentage deficit is greater on an absolute basis. For example, "more than about 45%" includes a sorbent that has a BWC value that is about 45% to about 100% less than the BWC of same volume of sorbent material in pelletized or powdered forms. Although it would initially appear to be a disadvantage, controlling the stacked sorbent material sheet product 700 to have a BWC value that is not higher than that of the same sorbent material in powdered or pelletized forms can have advantages when combined with the selection of the appropriate pressure drop or other features. Still further advantages of the embodiments disclosed herein include, but are not limited to, ease of manufacture, easier material handling, cost savings, fewer pieces, lower pressure drop, manufacturing advantage or other advantage, even if BWC improvement is not seen.

The unitary sorbent sheets 100 in the stacked sorbent material sheet product 700 may be configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.

When the unitary sorbent sheets 100 are formed, they can be formed with or without treatments that increase the level of adhesion between the substrate sheet 101 and one or more of the spacer strips 103 and spacer sheet 102. Examples of such treatments include inserting an intervening adhesive layer, inserting an intervening primer surface treatment, ultrasonic bonding, thermal bonding, or corona discharge treatment. In other embodiments, no surface treatment of any kind is performed and the substrate sheet 101, spacer strips 103, and spacer sheets 102 held together only by mechanical forces, such as the friction imposed when being inserted into a tube, pouch, or housing.

Figure 8:
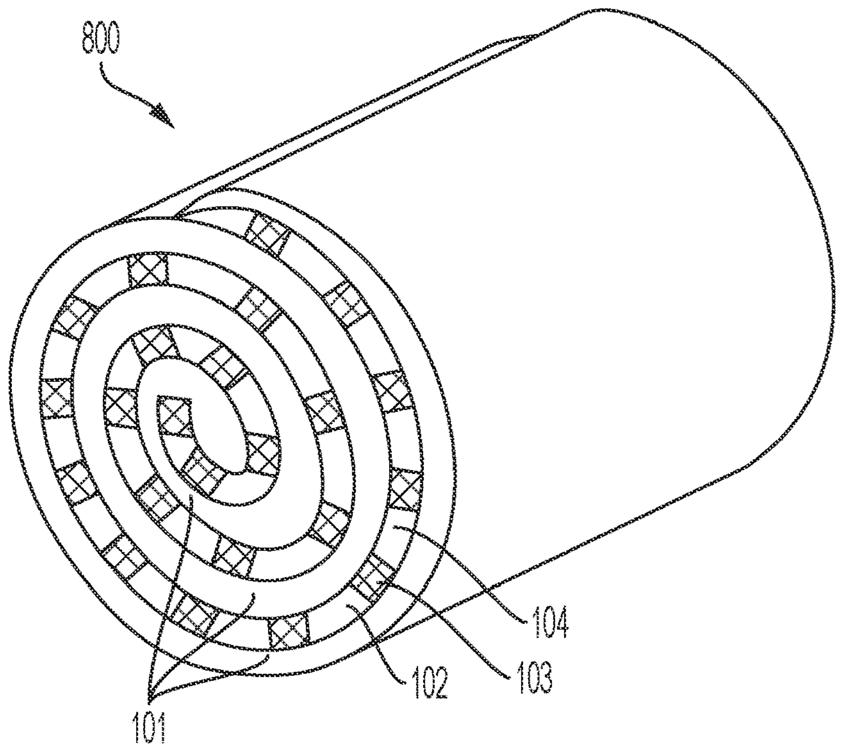
FIG. 8 is an isometric view of an embodiment of a wound sorbent material sheet product.

Wound Sorbent Material Sheet Product:

FIG. 8 is an isometric view of an embodiment of a wound sorbent material sheet product 800. A wound sorbent material sheet product 800 is made of at least one unitary sorbent sheet 100, comprising a substrate sheet 101 and a plurality of spacer strips 103, that is wound or rolled to achieve the desired characteristics including, but not limited to, density, void space, pressure drop, capacity, and the like. In some embodiments, multiple unitary sorbent sheets 100 may be used together.

The unitary sorbent sheet 100 can be wound or rolled as an alternative or in combination with the stacked sorbent material sheet product 700. A wound sorbent material sheet product 800 comprises a unitary sorbent sheet 100 defining an upper surface and a lower surface, and combined has a known total surface area, wherein the unitary sorbent sheet 100 comprises a sorbent material and a binder where the unitary sorbent sheet 100 is spiral wound to create adjacent layers of the unitary sorbent sheet 100 to allow fluid flow around and between the adjacent layers of the unitary sorbent sheet 100.

Similar to the stacked sorbent material sheet product 700, the wound sorbent material sheet product 800 has improved performance over the equivalent volume of activated carbon that is provided in pelletized or powdered form.

Performance improvements of the wound sorbent material sheet product 800 can be measured as the performance of the product having a given amount of activated carbon versus the performance of that same amount and grade of activated carbon if provided within a canister in a pelletized or powdered form. In some embodiments, a wound sorbent material sheet product 800 has a BWC that is about 3% higher, about 5% higher, about 7% higher, about 9% higher, about 10% higher, about 12% higher, about 14% higher, and about 16% higher than the same amount and grade of activated carbon within a canister in pelletized or powdered form. Ranges based on these amounts are also contemplated, such as performance that is between about 5-14% higher, between about 5-10% higher, between about 10-16% higher, and so forth.

When used as a main chamber, a wound sorbent material sheet product 700 has a BWC at least 10% higher than the BWC of a pelletized/powdered form of the same amount by volume of the wound sorbent material sheet product 800. A wound sorbent material sheet product 800 has a BWC greater than about 10 g/100 $cm^3$, or the wound sorbent material sheet product 800 has a BWC of about 7.0 g/100 $cm^3$ to about 20 g/100 $cm^3$, or greater than about 12 g/100 $cm^3$, or greater than about 13 g/100 $cm^3$, or greater than about 14 g/100 $cm^3$, or greater than about 15 g/100 $cm^3$, or greater than 20 g/100 $cm^3$. Ranges are also contemplated, such as about 10-20 g/100 $cm^3$, about 10-12 g/100 $cm^3$, about 10-14 g/100 $cm^3$, about 12-14 g/100 $cm^3$, about 12-15 g/$cm^3$, and about 15-20 g/$cm^3$.

When configured for a scrubber, a wound sorbent material sheet product 700 has a low overall BWC, such as about 1.0 g/100 $cm^3$ to about 10.0 g/100 $cm^3$, about 3.0 g/100 $cm^3$ to about 10.0 g/100 $cm^3$, about 5.0 g/100 $cm^3$ to about 10.0 g/100 $cm^3$, or any value falling within one of those ranges. The main chamber has a higher overall adsorptive capacity than the scrubber, but the main chamber and scrubber may have other properties that are the same or different depending on the design requirements, the materials selected, or both.

In certain embodiments, the overall adsorptive capacity measured in BWC of the wound sorbent material sheet product is based on the spacing between the spacer strips 103, spacer sheet 102, or substrate sheet 101. By varying the spacing between one or more of these components, the BWC can be controlled without the need to significantly change the materials. In some embodiments, sorbent material sheets which are made of the same sorbent material can be used to construct either a main chamber or a scrubber by varying the spacing, even though conventionally these would require substantially different sorbent materials or forms of sorbent materials (such as a pellet for the main chamber and a monolith for the scrubber). By using the same or substantially similar sorbent materials for both the main chamber and the scrubber, manufacturing is greatly simplified.

A wound sorbent material sheet product 800 as described herein has a generally cylindrical shape having a length substantially greater than its diameter, although any dimension can be employed, including conical, or frustro-conical variations, as well as ellipsoids, or other shapes.

The density of the wound sorbent material sheet product 800 may be computed based on the formulas below:

Roll Density Calculations (US units)

$$\rho\left(\frac{\text{lb}}{\text{ft}^2}\right) = (3) * \frac{BW * L}{\left(\frac{OD^2}{4} - \frac{ID^2}{4}\right) * z}$$

BW:

$$\text{Basis Weight}\left(\frac{sz}{\text{yd}^2}\right)$$

L: Length on Roll (yd)

OD: Outer Roll Diameter (in) ID: Inner Roll Diameter/Core Diameter (in)

W: Machine width or roll length (in) p:

$$\text{Roll Density}\left(\frac{\text{lb}}{\text{ft}^2}\right)$$

Roll Density Calculations (SI units)

$$\rho\left(\frac{\text{kg}}{\text{m}^3}\right) = (1000) * \frac{BW * L}{\left(\frac{OD^2}{4} - \frac{ID^2}{4}\right) * z}$$

BW:

$$\text{Basis Weight}\left(\frac{\text{g}}{\text{m}^3}\right)$$

L: Length on Roll (m)

OD: Outer Roll Diameter (mm) ID: Inner Diameter/Core Diameter (mm)

W: Machine width or roll length (mm) p:

$$\text{Roll Density}\left(\frac{\text{kg}}{\text{m}^3}\right)$$

The wound sorbent material sheet product 800 may be wound to an average roll density of about 80-2000 kg/$m^3$, about 500-2000 kg/$m^3$, about 750-1500 kg/$m^3$, about 900-1200 kg/$m^3$, about 900-1050 kg/$m^3$, about 400-500 kg/$m^3$, about 500-600 kg/$m^3$, about 500-550 kg/$m^3$, about 600-650 kg/$m^3$, about 650-700 kg/$m^3$, and about 700-750 kg/$m^3$. The wound sorbent material sheet product 800 has a BWC greater than about 7 g/100 $cm^3$, preferably greater than about 10 g/100 $cm^3$ In some embodiments, a wound sorbent material sheet product 800 has a BWC of about 7.0 g/100 $cm^3$ to about 30 g/100 $cm^3$. A wound sorbent material sheet product 800 may also have BWCs that are the same as the above described unitary sorbent sheets 100 that are not rolled.

Similar to the discussion above with respect to the stacked sorbent material sheet products 700, a wound sorbent material sheet product 800 may include multiple particle size distributions or populations of the adsorbent pelletized or powdered activated carbon. The same ratios are contemplated as discussed above. Similar to the discussion above, this results in greater performance because it enables a larger amount of the activated carbon to be incorporated into the unitary sorbent sheets 100 which are formed into a wound sorbent material sheet product 800.

As used herein, wound sorbent material sheet products 800 refer to any form of layering of one or more unitary sorbent sheets 100 by winding, spiral winding, concentric layering of tubular (of any cross-sectional shape, e.g. round, elliptical, square, triangular, rectangle, etc.) or combination thereof. For example, a single unitary sorbent sheet 100 may be spiral wound along its length to form a cylindrical-shaped wound sorbent material sheet product 800, as shown in FIG. 6. As another example, a plurality of unitary sorbent sheets 100 can be stacked and then wound together to form a similar cylindrical shape. As another alternative, several unitary sorbent sheets 100 each formed into a cylinder having a slightly different diameter from the next can be arranged such that they form concentric rings in cross-section of a similarly sized cylinder. Various combinations of these and other arrangements may be used to fill the space within any shape of housing or canister, as described elsewhere herein.

As used in the context of a wound sorbent material sheet product 800, the term substantially parallel is used to mean that at a minute, infinitely small dimension, the substrate sheets 101 of two unitary sorbent sheets 100 or layers of the substrate sheet 101 of one unitary sorbent sheet 100 are substantially the same distance from each other in the radial or linear directions. However, it is also understood that in the context of the wound sorbent material sheet product 800, especially those that are a single unitary sorbent sheet 100 wound in a spiral around a center or core, that this means that the substrate sheets 101 are not exactly the same distance apart from each other over the entire areas that face each other. Furthermore, it is understood that in this context, similar variations in distance are contemplated between the unitary sorbent sheet 100 or unitary sorbent sheets 100 due to components such as spacers, sensors, apertures, tubing, ports, valves, channels, corrugations, pleats, folds, deformation encountered during manufacturing or operation, deformation due to the shape or pressures applied by or through the external housing, different wrapping techniques such as to seal the periphery of the sheets, and so forth.

As noted above with respect to the sorbent material sheets, the binder is selected from polytetrafluoroethylene (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof.

In all of the above embodiments, the sorbent is made flexible and has high surface area available for vapors and gases that are passed over it. This means that the sorbent can be made to fit in confined spaces, such as small canisters, small canister chambers, flexible tubing, curved tubing, irregular shapes, snaked or otherwise irregular tubing, and other shapes that would be difficult to fit conventional forms of sorbent. These advantages permit the sorbent material sheet products to be used in a variety of configurations that are not possible with conventional powdered, granulated, or pelleted sorbent.

Figure 9:
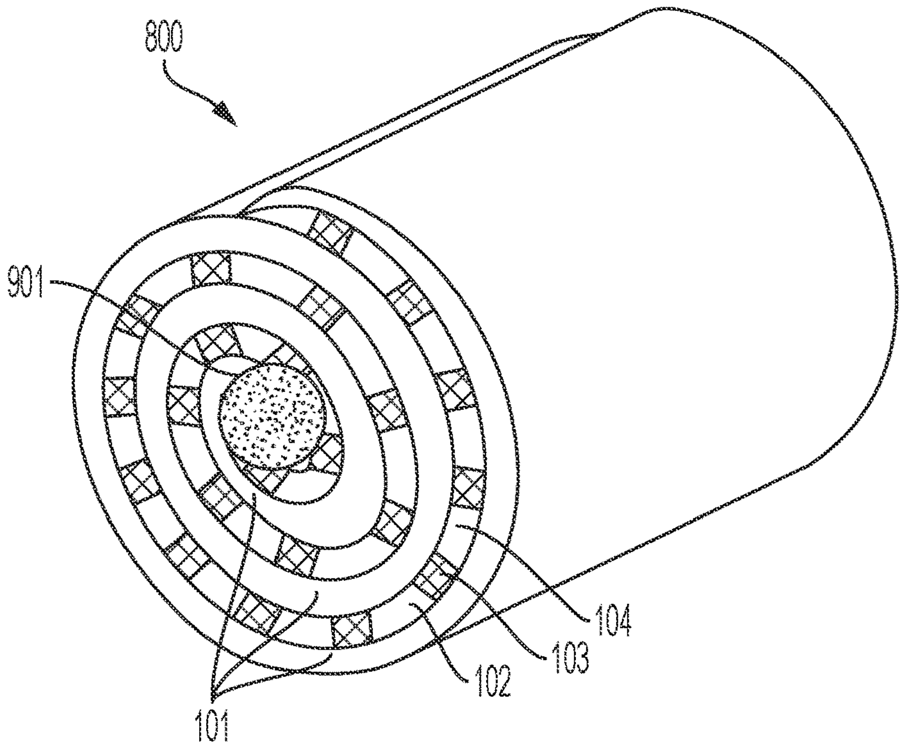
FIG. 9 is an isometric view of an embodiment of a wound sorbent material sheet product with a center core.

FIG. 9 is an isometric view of an embodiment of a wound sorbent material sheet product 800 with a center core 901. The wound sorbent material sheet products 800 are typically made by winding the unitary sorbent sheets 100 around a center core 901, such as a solid, central, cylindrical spindle. This is some solid polymer or other material. The spindle is solid and takes up volume. In other instances, the unitary sorbent sheet 100 is wound about an open central core, such as a rigid or semi-rigid tube. In either case, the center core 901 does not contribute to the performance of the wound sorbent material sheet product 800. In one embodiment, the center core 901 is put to good use. In an embodiment, the unitary sorbent sheet 100 is wound around a center core 901 made of adsorptive material producing a wound sorbent material sheet product 800 with additional adsorptive capacity.

In an embodiment, the center core 901 is fabricated from sorbent material or as a structure that would serve as a core with internal volume filled with sorbent material. The advantage of this would be to increase the amount of adsorbent within the device, thereby increasing performance when configured for a main chamber. The center core 901 could take the form of an open space, a hollow tube, a perforated hollow tube, or other structure used to define a space which holds additional sorbent material. The increase in sorbent material should result in even better performance.

The center core 901 may include not only the unitary sorbent sheets 100 described above, but also other forms of the sorbent material, such as cut or shredded sheets, rope, yarn, and the like.

Another improvement relates to improving flow between or within the substrate layers 101 of a wound sorbent material sheet product 800. Winding of sorbent material sheets into spirals to form an adsorber was accomplished by controlling the tension of the winding process. Because the sorbent material sheets are flexible and of low tensile strength, this sometimes leads to adsorbers where the spacing between the wound sorbent material sheets was inconsistent, difficult to control or non-existent. Spacer strips 104 control the spacing between layers of substrate sheets 101 in a wound sorbent material sheet product 800.

To increase the tensile strength of the unitary sorbent sheet 100, a polymer or fibrous netting could be incorporated into the sorbent material sheet used for the substrate sheet 101 during the roll milling process. The netting could be of various configurations and thicknesses depending on the desired properties of the final unitary sorbent sheet 100. The goal is to increase the tensile strength of the unitary sorbent sheet 100 allowing for more reliable winding to maintain separation and ease of manufacture.

Any of these spacers could be used with a stacked sorbent material sheet product 700 as well as a wound sorbent material sheet product 800 with the same advantages. In either structure, the space creates uniform spacing. When spacer sheets 102 are used as the spacer material, they add to the adsorptive qualities.

The Housing

Figure 10:
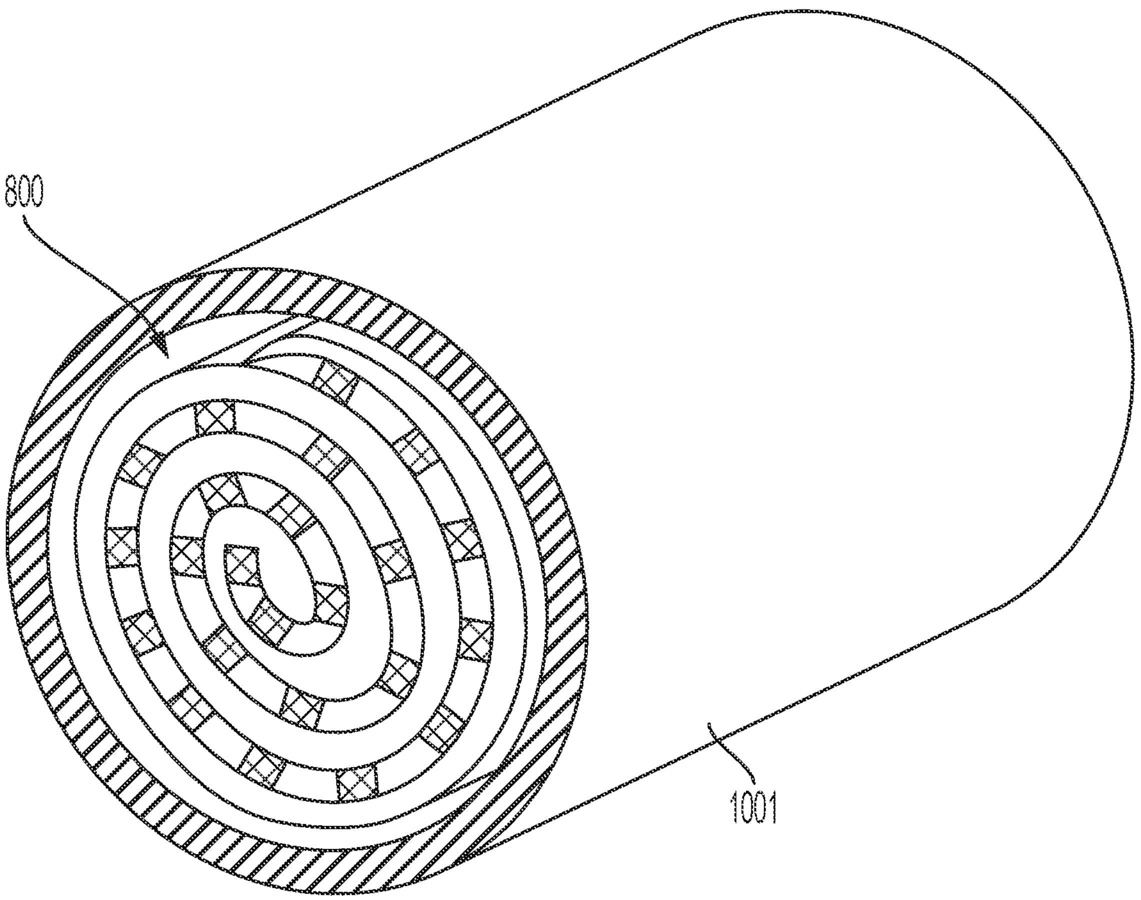
FIG. 10 is an isometric view of an embodiment of a wound sorbent material sheet product housed in a cylindrical housing.

FIG. 10 is an isometric view of an embodiment of a wound sorbent material sheet product 800 housed in a cylindrical housing 1001. In some embodiments, the sorbent material sheet product contemplates the use of a housing 1001 which partially or totally encapsulates a sorbent material sheet product. It should be noted that while the term "housing" is used in this specification to describe the overall outer structure that at least partially encapsulates a sorbent material sheet product, it is understood that such structures are known by many other terms to those of skill in the art. For example, in automotive or other fields where emissions must be controlled, the housing 1001 may be referred to as a canister, cartridge, scrubber, or the like. It is therefore contemplated that the term "housing" broadly encompasses a variety of terms and structures including canisters, cartridges, scrubbers, flexible bags, molded polymer casings, metal casings, and so forth that are used in the field of emissions control. Furthermore the term "housing" may refer to an empty structure awaiting the inclusion of a sorbent material sheet product, i.e., an unfinished part, or a completed emissions control part that includes the sorbent contained within the canister, cartridge, scrubber, flexible bag, etc. It is contemplated that these parts may be interchanged or combined depending on design requirements.

Figure 11:
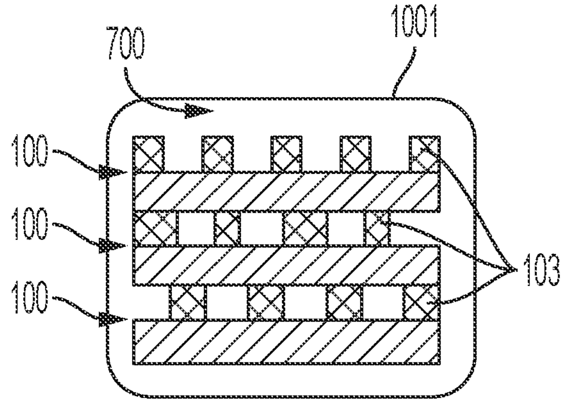
FIG. 11 is a side view of a stacked sorbent material sheet product in a flexible housing 1001.

The housing 1001 may be configured in a variety of shapes, for example tetrahedrons, cubes and cuboidal shapes, cylinders, spheres, hyperboloids of a single sheet, conical shapes, ellipsoidal shapes, rectangular shapes, hyperbolic paraboloid shapes, elongated bar shapes, paraboloids, and combinations of these shapes. The combinations may be selected to have different sections each of which have different shapes or portions of different shapes. The housing 1001 may also include sections which are separated and are connected by an additional part, for instance, at least one hose or tube which is designed to transfer fuel vapors as needed, or a thin portion of housing 1001 that contains a sorbent material sheet product. The housing 1001 may also be configured with no shape, for example as a flexible bag or pouch containing a sorbent material sheet product, as shown in FIG. 11. Referring back to FIG. 10, the housing 1001 is substantially cylindrical.

One major advantage is that the unitary sorbent sheets 100 are both flexible and self-supporting and can be laminated, rolled, wound, folded, or stacked in a variety of configurations within the housing to suit different mechanical requirements within the tight confines of a vehicle. In such embodiments, the housing 1001 would be designed to conform or fit the spaces that are available for the device to be stored. For instance, the housing 1001 can be sized and shaped to fit in spaces within or surrounding wheel wells, driveshafts, batteries for hybrid powertrains, spare tires, tire changing tools, tire patching tools, vehicle trunks or other storage spaces, vehicle bumpers and bodywork panels, exhaust systems, other emissions control equipment such as urea or other injection tanks, fuel lines, vehicle frames, suspension components, engine compartment, under passenger compartment seats, within passenger compartment seats, and other spaces which are too small or too difficult to reach to be effectively utilized for passenger or cargo space.

FIG. 11 is a side view of a stacked sorbent material sheet product 700 in a flexible housing 1001. To further reduce weight and size and take advantage of the self-supporting sorbent material sheet products, the housing 1001 can be in the form of a thin walled bag or pouch. This is possible because the unitary sorbent sheets 100 have some mechanical structure and are self-supporting and so do not require a rigid outer container as in conventional canisters. The film materials that form the bag can have thicknesses of about 10 μm to about 250 μm. In other embodiments, the bag film can have thicknesses of about 20 μm to about 175 μm, and the bag film can have thicknesses of about 50 μm to about 125 μm. The film materials can be flexible.

The bag or pouch may be formed of any materials which are used in fuel systems, and particularly are formed of materials which are designed to withstand the chemical effects of the fuel vapors contained. Bag materials include polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The bag is typically thermoplastic for flexibility, but can also be a combination with amounts of thermoset or can be in the form of a cured rubber or an elastomer.

The housing, bag, or pouch may also be designed to act as a vapor barrier to the adsorbed fuel vapors contained therein. This barrier property may be inherent to the polymer itself, or may be achieved through the use of at least one barrier additive and/or at least one barrier layer. Examples of barrier additives which can be formed as a layer or as a particulate filler include polymers such as epoxy, polyamide, polyamide imides, fluoropolymers, fluororubbers, and combinations of those. Barrier layers can also be made of metals such as aluminum, steel, titanium, and alloys of those. The metal barrier layers can be formed by conventional mechanical means, such as coextrusion or adhering with the other layers of the housing, or they can be chemically deposited, such as by chemical vapor deposition or electroplating. The metal barrier layer can be formed from a foil having a thickness of less than about 25 μm, less than about 20 μm, less than about 15 μm, less than about 10 μm, or less than about 5 μm.

The housing 1001 and its materials may also be selected to be compatible with "ship in a bottle" fuel systems. In such systems, many or all of the fuel system components, including the fuel pumps, ORVR, fuel filters, valves, and other components are fitted within the vehicle fuel tank. Such systems are advantageous because they reduce assembly time and the amount of space required by the fuel system. In such systems, the housing 1001 should have materials which are capable of being immersed in the selected fuel, typically gasoline, for extended periods of time within the vehicle fuel tank, while also being able to withstand the effects of the adsorbed fuel vapors within.

Figure 12:
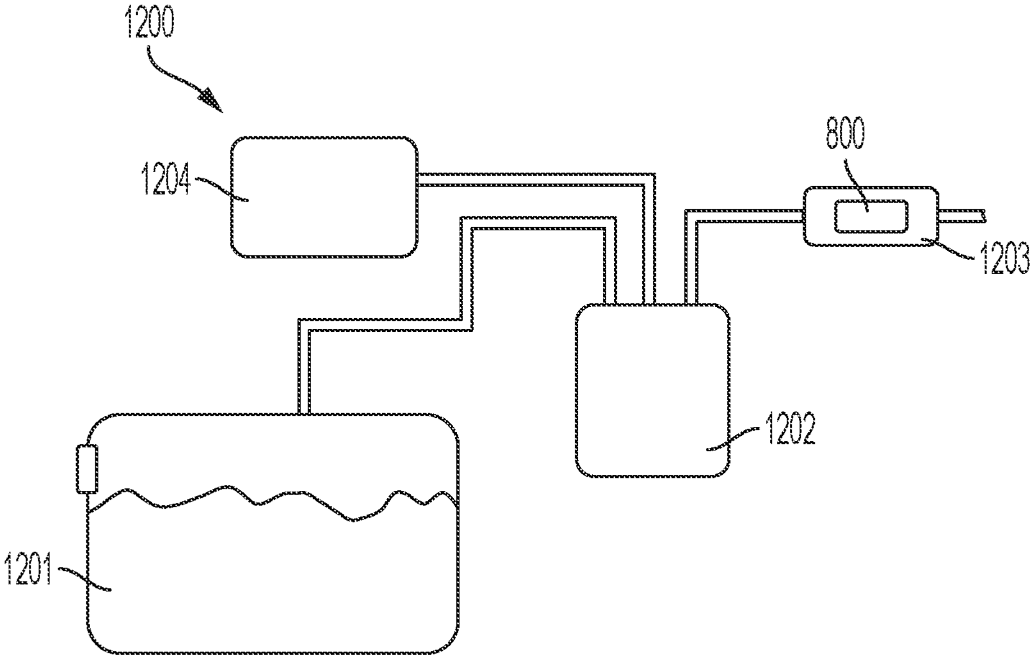
FIG. 12 is an example ORVR that can form the housing of a sorbent material sheet product.

FIG. 12 is an example ORVR 1200 that can form the housing 1001 of a sorbent material sheet product. The ORVR 1200 may include a fuel tank 1201, a main chamber 1202, a sub-chamber 1203, and an engine intake 1204. A wound sorbent material sheet product 800 may be housed in the sub-chamber 1203 of an ORVR 1200.

The housing 1001 may also be a thin metal housing. The thin metal housing 1001 can be formed of flexible or rigid metals such as steel, aluminum, titanium, and alloys of those. The metal housing 1001 can be formed from a foil having a thickness of about 5-100 μm, or about 10-250 μm. In some embodiments, the foil may be as thick as about 1 mm. Whether the housing 1001 is flexible or rigid depends on the selection of the material, the thickness, and any treatments that have been applied to the metals, such as heat treatments or hot or cold working.

In some embodiments, the housing 1001 for a sorbent material sheet product may be omitted entirely, with a sorbent material sheet product being contained within the fuel tank itself. In such configurations, a sorbent material sheet product can be attached to a portion of the interior of the fuel tank that does not regularly come in contact with liquid fuel and which is free to adsorb fuel vapors. This portion is typically the top or sides of the fuel tank, or combinations of those. The fuel tank may also include a recessed portion on the top or the sides which is designed to include the sorbent material sheet product and allow the sorbent material sheet product to adsorb fuel vapors. Such embodiments where a sorbent material sheet product is attached to the interior portions of the fuel tank not only offer maximum space savings and weight savings by omitting the canister structure, but also simplify manufacturing and installation because a sorbent material sheet product is already installed within the fuel tank during vehicle assembly.

The housing 1001 can also be eliminated by forming a rolled or folded one or more unitary sorbent sheets 100 and then selectively curing the outer portion of unitary sorbent sheet 100 to form a durable, cured shell that acts as a support for the rolled or folded unitary sorbent sheets 100 within. Such selective curing can be accomplished thermally or with a chemical bath, or via actinic radiation, such as ultraviolet light or by electron beam curing.

In embodiments where the sorbent material sheet products omit the housing 1001 and are contained within the vehicle fuel tank itself, a sorbent material sheet product may be attached to the fuel tank in a variety of ways. A sorbent material sheet product can be fastened using mechanical fasteners such as screws, rivets, or clamps, or a sorbent material sheet product may be fastened using an adhesive backing positioned between the fuel tank wall and the sorbent material sheet product. The adhesive backing may be a single layer of adhesive or a double sided adhesive tape or sheet. The adhesive used in the adhesive backing may include pressure sensitive adhesives, UV curing adhesives, thermally curing adhesives, hot melt adhesives, and reactive multi-part adhesives. Adhesive compositions include acrylic and (meth)acrylic, acrylate and (meth)acrylate, epoxies in one- and two-part formulations, and urethane.

A sorbent material sheet product may be applied during manufacturing in a variety of ways. In some embodiments, the fuel tank may be formed and a sorbent material sheet product may be applied in a separate step where the adhesive is applied followed by the application of the sorbent material sheet product. In other embodiments, a sorbent material sheet product is placed, with or without an adhesive backing as appropriate, on the inside of a mold and the fuel tank is injected or blow molded around the sorbent material sheet product. In other embodiments, a sorbent material sheet product may be coextruded with panels of material which make up the sides of the fuel tank, and the edges of those panels are adhered or welded together to seal the final tank with the sorbent material sheet product on the inside.

When a sorbent material sheet product is contained within the vehicle fuel tank without the housing 1001, the fuel tank may include additional valves and ports to accommodate the adsorption and desorption of fuel vapors in the fuel tank. For example, during engine operation, air may be introduced into the fuel tank to desorb the fuel vapors that are contained in the sorbent material sheet product, as well as those which are present in the tank. These desorbed fuel vapors are then sent to the engine for combustion during optimal cycles as required by the ECU.

When a sorbent material sheet product is provided without a housing 1001 and is contained within a tank, such as a vehicle fuel tank, it may be positioned so that it is not regularly immersed in the volatile liquids typically contained within the tank. This ensures that the sorbent material sheet product does not become prematurely saturated, and also ensures that sufficient surface area is exposed to the vapors within the fuel tank to effect the adsorption of the vapors. The feature contemplates that a sorbent material sheet product can be placed in parts of the tank that are unfilled, such as the ullage or headspace of the tank, or near baffles which prevent the sloshing of liquids on the sorbent material sheet product. A sorbent material sheet product may also be placed in a dedicated portion of the tank, such as a small chamber or niche, where the liquids cannot enter.

The devices of various embodiments may include a housing 1001 and embodiments of the sorbent material sheet products described above. The housing 1001 may be any shape and can be configured for purifying gases or liquids. For example, in some embodiments, the housing 1001 may be any shape such as, for example, cuboidal, cubic, or cylindrical. Sorbent material sheet products may be sized to fit within the housing 1001 and substantially fill a space within the housing 1001 through which the gas or liquid is passed. In some embodiments, two or more unitary sorbent sheets 100 may be stacked to substantially fill the housing 1001, and in other embodiments, the unitary sorbent sheets 100 may be rolled to form a wound sorbent material sheet product 800 or stacked to form a stacked sorbent material sheet product 800. In some embodiments, the stacked or pressed unitary sorbent sheets 100 may be such that the sides of adjoining unitary sorbent sheets 100 are substantially contiguous. In other embodiments, stacked or pressed unitary sorbent sheets 100 may be positioned such that adjoining unitary sorbent sheets 100 are spaced. For example, in certain embodiments, the unitary sorbent sheets 100 may be corrugated, having unitary sorbent material sheets 100 that form a series or parallel ridges and furrows, and in some embodiments, corrugated unitary sorbent sheets 100 may be separated by flat unitary sorbent sheets 100. The corrugated unitary sorbent sheets 100 may be disposed within the housing in a stacked or rolled/spiral wound form.

In various embodiments, the void fraction may be about 30% to about 32% less than the void volume for current devices, and in some embodiments, the void fraction may be as low as about 10%. For example, the devices may have a void fraction of about 45% to about 10%, about 35% to about 10%, about 25% to about 10%, or any individual void fraction or range encompassed by these example ranges. The devices of various embodiments may exhibit less flow restriction, e.g. pressure drop, than devices having granular or pelleted sorbent materials. Thus, more adsorbent material can be incorporated into such devices without reducing the flow rate of the device.

The devices of such embodiments may have BWCs of greater than about 4.0 g/100 $cm^3$, and in some embodiments, the devices may have a BWC of about 4.0 g/100 $cm^3$ to about 20 g/100 $cm^3$, 5.0 g/100 $cm^3$ to about 18 g/100 $cm^3$, about 7.0 g/100 $cm^3$ to about 16 g/100 $cm^3$, or about 8.0 g/100 $cm^3$ to about 15 g/100 $cm^3$, or any individual BWC or range encompassed by these example ranges. The devices may exhibit a pressure drop that is at most equal to a conventional dense pack bed of powders, pellets, or granules of activated carbon or other activated compounds. This feature is advantageous because it ensures that the sorbent material sheet product, whether stacked, rolled, wound, or otherwise configured, still has the same ability to process and transfer vapors and gases as conventional devices, despite the increased sorbent performance.

When the unitary sorbent sheet 100, in a stacked 700 or wound 800 sorbent material sheet product, is combined with a housing 1001, it is useful as a vapor loss canister or other device. As noted above, the shapes and properties achieved via the stacked or rolled products allow for unique placement and improved performance.

In accordance with some embodiments, the housing 1001 is a vapor loss canister. A sorbent material sheet product may be sized and configured to fit within a vapor loss canister and fill substantially the entire internal space within the vapor loss canister, wherein the internal space is substantially free of additional internal material other than the sorbent material sheet product. That is, traditional vapor loss canisters require springs, filters, support substrates, etc. to hold and maintain the loose carbon powder or pellets. Because the sorbent material sheet products are substantially self-supporting, these additional support structures are not needed. This allows for the inclusion of more sorbent material or the use of a smaller canister without sacrificing performance.

In some embodiments, the sorbent material sheet product comprises a stacked sorbent material sheet product 700 as described above. In such instances, the housing 1001 or canister can take any shape as discussed above, but in some embodiments, is relatively flat and flexible for housing stacked sorbent material sheet product 700 wherein the height of the stacked sorbent material sheet product 700 is substantially less than its length or width. In these instances, the housing 1001 may be a flexible bag or pouch, as discussed above.

In some instances the vapor loss canister is adapted for placement atop or even within a fuel tank.

In some embodiments, sorbent material sheet product comprises a wound sorbent material sheet product 800 as described above. In some instances, at least a portion of the housing 1001 sidewall defines a filter substantially without occupying any internal canister space.

In some embodiments, a fuel tank may be provided with integral vapor adsorption. Such tanks comprise a tank structure, and at least one sorbent material sheet product, either unitary 100, stacked 700, or wound 800, at least one fastening device which fastens the sorbent material sheet product to a surface of the tank that is not regularly immersed in the volatile liquids contained within the tank. The fastening device may be an adhesive layer which is formed between one surface of the sorbent material sheet product and a wall of the tank.

Such adhesive may be at least one of pressure sensitive adhesives, UV curing adhesives, thermally curing adhesives, hot melt adhesives, reactive multi-part adhesives, acrylic and (meth)acrylic adhesives, acrylate and (meth)acrylate adhesives, epoxies adhesives in one- and two-part formulations, urethane adhesives, and copolymers and combinations thereof.

The tank may further include one or more of at least one fuel pump(s), fuel sending line(s), fuel return line(s), atmospheric vent line, port(s), valve(s), sensor(s), air inlet(s), open cell foam, baffle(s), bladder(s) and combinations of those.

In some embodiments, the tank is a fuel tank with a "ship in a bottle" configuration.

Some embodiments provide an onboard refueling vapor recovery apparatus comprising the sorbent material sheet product as described herein. The onboard refueling vapor recovery apparatus may include a vapor adsorbing canister as described herein. The onboard refueling vapor recovery apparatus may include a tank with integral vapor adsorption as described in the specification.

Additional Components

Some embodiments may include sensors such as a fuel composition sensor. The fuel composition sensor may be used to detect the mixture of gasoline and ethanol contained within the housing and the sorbent material sheet product, and this information may be communicated to the ECU so that vapors which are later released to the engine can be more precisely used during engine combustion. Other sensors include temperature sensors, vapor pressure sensors, oxygen sensors, and the like. The sensors can operate on principles of electrochemical interaction, electronic such as thermocouples, electromechanical, refractive index, infrared spectroscopy, and others depending on the type of information that is required for the ECU. The sensors can be included alone or in combination within the housing 1001, or, if no housing is specified, within the area that contains a sorbent material sheet product. The sensors can be included in holes or notches which are cut from the unitary sorbent sheet 100, or in spaces between the unitary sorbent sheet 100 with the unitary sorbent sheet 100 product wrapped or folded around the sensors.

Some embodiments may include inlets, outlets, hoses, and associated valves to control the flow of fuel vapor to and from the sorbent material sheet products. The openings may be static or they may have valves that are opened and closed as required by the ECU to control the flow of vapor into and out of a sorbent material sheet product. For example, during refueling, outlet valves remain closed to ensure that displaced fuel vapors do not escape into the atmosphere. However, when the engine operates and the ECU requests it, at least one outlet valve may open to allow the release of adsorbed vapor into the engine to allow its combustion. There may also be included a vent and valve to the atmosphere in case there is too much fuel vapor for the sorbent material sheet product to safely adsorb. There may further be included an inlet and valve for air or other gases, such as inert exhaust gases, which is used to desorb the fuel vapor as it is being sent to the engine for combustion.

Some embodiments contemplate the inclusion of and integration with other components which make up ORVR systems and devices. These other components may include active compressors and condensers, fuel tank heaters, fuel tank heat exchanging coils for cooling enclosed fuels, fuel filler necks, fuel filler ports, including cap-less fuel filler ports, vents for fuel vapors, fuel lines for sending fuel, fuel return lines, vents and vehicle rollover valves, fuel pumps, and air intake or purge valves.

Some embodiments contemplate devices and structures which may be combined with a sorbent material sheet product to improve or control the adsorption and desorption of fluids and gases. For example, fans or pumps may be included to force the fluids or vapors over the sorbent material sheet products as they are assembled, allowing the sorbent material sheet products to be packed or wound tighter or allowing larger devices than would otherwise be possible with the same amount of fluid diffusion over the sheets. Alternatively, the devices can include resistance element heaters, or Peltier effect heaters or coolers which are designed to heat and/or cool the fluids and thus force their movement over a sorbent material sheet product. For instance, heated, expanding fluid may vent upwards and draw in more fluid at the bottom of a rolled or wound article that is oriented vertically to take advantage of the effects of gravity.

Other Uses

In addition to automotive uses, the inventors contemplate that the sorbent material sheet products can be used in any instance where a tank or other enclosed space is designed to contain volatile liquids, in particular volatile hydrocarbons such as fuels, solvents, and other volatile compounds. Examples include but are not limited to fuel tanks in aircraft, fuel tanks in ships and other marine vehicles, fuel tanks in trucks, chemical tanks in railroad cars, barges, ships, trucks, vehicles, and other bulk carriers, and stationary chemical tanks. Sorbent material sheet products can also be attached or adhered to the walls of confined spaces where the presence of volatile compounds would be detrimental, for example, in chemical facilities where operators and maintenance staff must periodically access the space. Such sorbent material sheet products, when used in such combined spaces, can not only increase safety for operators and maintenance staff, but they can also reduce the need for cumbersome protective gear.

EXAMPLES

Although sorbent material sheet products have been described in considerable detail with reference to certain preferred embodiments thereof, other versions are possible. Therefore the spirit and scope of the appended claims should not be limited to the description and the preferred versions contained within this specification. Various aspects of the sorbent material sheet products will be illustrated with reference to the following non-limiting examples.

As was discussed above, butane working capacity (BWC) is a measure of the performance of activated carbon. BWC is determined for a sample by measuring the ability of the activated carbon to adsorb and desorb butane from dry air under specified conditions, and measures the difference between the butane adsorbed at saturated and the butane retained per unit volume of carbon after a specified purge. BWC can be tested in several ways, including procedures specified by ASTM International and which are known to those of skill in the art. Specifically, testing can follow ASTM D5228, which includes revisions D5228-16, D5228-92 (2015), D5228-92 (2005), and D5228-92 (2000).

In Examples 1-4, the carbon sheets were spiral wound to yield 10% void fraction, which gave about a 30% performance improvement over the activated carbon alone. The void fraction of comparative granular or powdered beds of activated carbon, similar to Comparative Example 1, was approximately 40% void fraction by volume. The Examples and Comparative Example are described below.

Example 1

Activated carbon sheets were made from CPL (CT #14299-8), which is an activated carbon that is wood based and which is activated using phosphoric acid. Sheets were also made from CPW (CT #14299-10), which is an activated carbon that is wood based and which is activated using phosphoric acid. The activated carbons were pulverized in a mechanical mortar and pestle and mixed with 9% PTFE powder. The resulting composition had a bread dough-like consistency. The composition was rolled to form sheets having thicknesses of 0.448 mm (CT #14299-8 1), 0.411 mm (CT #14299-8 2), 0.459 mm (CT #14299-10 1), and 0.439 mm (CT #14299-10 2). As used herein, GAC is used to denote granular activated carbon, and PAC is used to denote powdered activated carbon.

Example 2

Activated carbon sheets were prepared as described in Example 1 using BVC-11 8×25 activated carbon, which is a nutshell based activated carbon that is activated with phosphoric acid. This formed sample CT #14266-1. A sample was also formed with BVC-11 8×35, which is also a nutshell based activated carbon that is activated with phosphoric acid. This formed sample CT #14266-2. The formed sheets had a thickness of 0.330 mm (CT #14266-1 1), 0.334 mm (CT #14266-1 2), 0.327 mm (CT #14266-1 3), 0.317 mm (CT #14266-2 1), 0.307 mm (CT #14266-2 2), and 0.328 mm (CT #14266-2 3).

Butane Working Test—Examples 1 and 2

Activated carbon sheets prepared in Examples 1 and 2 were tested for butane adsorption using the butane working test. In this test, the sheets were rolled and placed in tubes. Butane was added to the tubes and butane adsorption was measured. Results are illustrated in TABLES 1 and 2:

TABLE 1

(Example 2)

| | 14266-1 | 14266-2 |
|---|---|---|
| Tube vol. ($cm^3$) | 3.8485 | 3.8485 |
| Sheet wt. (g) | 6.3604 | 6.0009 |
| Sheet thick. (mm) | 0.330 | 0.315 |
| Sheet vol. ($cm^3$) | 11.22 | 10.71 |
| Sheet dens. ($g/cm^3$) | 0.567 | 0.567 |
| BWC sheet measured ($g/100\ cm^3$) | 16.10 | 14.14 |
| BWC GAC measured ($g/100\ cm^3$) | 12.10 | 12.20 |

TABLE 2

(Example 1)

| | CT-14299-8 | CT-14299-10 |
|---|---|---|
| Tube vol. ($cm^3$) | 16.504 | 16.504 |
| Sheet wt. (g) | 4.10 | 3.16 |
| Sheet thick. (mm) | 0.411 | 0.439 |
| Sheet vol. ($cm^3$) | 9.92 | 7.90 |
| Sheet dens. ($g/cm^3$) | 0.413 | 0.404 |
| BWC sheet measured ($g/100\ cm^3$) | 12.32 | 12.41 |
| BWC PAC measured ($g/100\ cm^3$) | 7.9 | 9.6 |

Example 3

Activated carbon sheets were prepared as in Examples 1 and 2, but using granular activated carbon #3445-32-4. The activated carbon sheets were also not rolled as tightly as in prior Examples 1 and 2, and the resultant sheets were tested for butane adsorption using the BWC test. In these two tests, two separate stacks of 20 sheets of 0.45 mm thickness were cut in rectangles of 2.2 cm×7.5 cm±10%, sealed at the side edge with double sided tape of 0.05 mm thickness and 2 mm width. In this configuration, tape thickness defined the average sheet spacing. Total height of each of the stacks of 20 sheets with tape spacers was 1 cm. These stacks of sheets were then placed in large 2.54 cm diameter cylindrical glass tubes for butane adsorption/desorption testing. The excess volume between the rectangular stack of sheets and the walls of the cylindrical glass tube were filled with closed cell expanded foam to take up the excess volume and sealed to avoid bypass gas flow past the inserted test samples. The butane or air was forced to flow in the 0.05 mm gaps between the 20 sheets. The flow rate and volume of the stacks of sheets was selected to conform to the BWC procedure. The BWC procedure was followed with the exception of the use of the stack of sheets rather than a granular bed, the use of the closed cell expanded foam for sealing, and the required larger cylindrical glass tube arrangement to accommodate the rectangular stack of sheets.

During the modified BWC procedure, butane or air was forced to flow in the 0.05 mm gaps between the 20 sheets, with the flow rate and volume of the stacks of sheets kept to BWC procedure for working capacity. The results of Example 3 are in Table 3 below.

Comparative Example 1

A comparative example was also prepared using the same granular activated carbon #3445-32-4 as in Example 4, but without forming the granular activated carbon as part of a sheet or roll. The granulated activated carbon was tested per BWC procedure. The results of this test are in Table 3 below.

TABLE 3

(Example 3 and Comparative Example 1)

| | Granular activated carbon (Comparative Example 1) | Stacked 0.45 mm sheets (Example 3) | |
|---|---|---|---|
| | #3445-32-4 | #3445-32-4-stack 1 | #3445-32-4-stack 2 |
| Tube vol. minus foam volume if present ($cm^3$) | 16.7 | 16.4 | 15.5 |
| Carbon wt. (g) | 6.513 | 7.885 | 7.465 |
| Sheet thickness (mm) | — | 0.45 | 0.45 |
| Granular bed or Stacked sheet vol. ($cm^3$) | 16.7 | 16.4 | 15.5 |
| Granular bed or individual Sheet density ($g/cm^3$) | 0.389 | 0.534 | 0.534 |
| BWC ($g/100\ cm^3$) | 9.33 | 10.25 | 10.83 |
| BWC % improvement | — | 9.9% | 16.0% |

Conclusion and Summary of Examples 1-3 and Comparative Example 1

A summary of relevant data appears in Table 4 below:

TABLE 4

Summary of Data

| Example | Test | Description | Sheet Thickness (mm) | Density ($g/cm^3$) | BWC ($g/100\ cm^3$) |
|---|---|---|---|---|---|
| Ex. 1 | CT#14299-8 | Wood based activated carbon CPL | 0.411 | 0.413 | 12.32 |
| Ex. 1 | CT#14299-10 | Wood based activated carbon CPW | 0.439 | 0.404 | 12.41 |
| Ex. 2 | CT#14266-1 | BVC-11 (nutshell) activated carbon 8 × 25 | 0.330 | 0.567 | 16.10 |
| Ex. 2 | CT#14266-2 | BVC-11 (nutshell) activated carbon 8 × 35 | 0.315 | 0.567 | 14.14 |
| Ex. 3 | #3445-32-4-stack 1 | GAC, 20 sheet stack | 0.45 | 0.534 | 10.25 |
| Ex. 3 | #3445-32-4 stack 2 | GAC, 20 sheet stack | 0.45 | 0.534 | 10.83 |
| Comp. Ex. 1 | #3445-32-4 | Granular Activated Carbon (GAC) | N/A | 0.389 | 9.33 |

Example 4

Several samples were constructed in accordance with the disclosure. Sample 3469-71-6 was constructed according to the templated strip method, similar to the templated strips as shown in FIG. 8 and placed within a cylindrical tube simulating an evaporative adsorption canister as shown in FIG. 10. Similar to FIG. 8 and FIG. 10, spacer strips 103 were wound with substrate sheet 101 so as to control the size and frequency of the intervening spaces 104. Note that for Sample 3469-71-6, no spacer sheets 102 were included, and the substrate sheets 101 were separated by the spacer strips 103.

Sample 3469-65-1 was assembled with conventional patterning methods, which means that the substrate sheets were wound in a cylinder and placed within a cylindrical tube, but no spacer strips or spacer sheets were placed between the substrate sheets. Instead, the sheets were slightly spaced apart by the patterning that was imparted to their surface.

Sample 3482-13-1 was assembled with flat substrate sheets, and no spacer strips, spacer sheets, or patterning was included.

TABLE 5A

| Original Pressure Drop Measurements (Inches $H_2O$) | | | | | | | | |
|---|---|---|---|---|---|---|---|---|
| | dP (inch $H_2O$) | | | Blank | Net dP (inch $H_2O$) | | | |
| Flow Rate (L/min) | Sample 3482-13-1 | Sample 3469-65-1 | Sample 3469-71-6 | dP (inch $H_2O$) | Sample 3482-13-1 | Sample 3469-65-1 | Sample 3469-71-6 | dP % Improvement |
| 10 | >10 | 0.43 | 0.05 | 0.01 | >10.0 | 0.42 | 0.04 | 89 |
| 30 | >10 | 1.35 | 0.20 | 0.10 | >10.0 | 1.25 | 0.10 | 92 |
| 50 | >10 | 2.30 | 0.50 | 0.30 | >10.0 | 2.00 | 0.20 | 90 |
| 70 | >10 | 3.40 | 0.85 | 0.55 | >10.0 | 2.85 | 0.30 | 89 |

TABLE 5B

| Pressure Drop Measurements (Converted to kPa) | | | | | | | | |
|---|---|---|---|---|---|---|---|---|
| | dP (kPa) | | | | Net dP (kPa) | | | |
| Flow Rate (L/min) | Sample 3482-13-1 | Sample 3469-65-1 | Sample 3469-71-6 | Blank dP (kPa) | Sample 3482-13-1 | Sample 3469-65-1 | Sample 3469-71-6 | dP % Improvement |
| 10 | >2.5 | 0.11 | 0.01 | ~0.00 | >2.5 | 0.10 | 0.01 | 89 |
| 30 | >2.5 | 0.34 | 0.05 | 0.02 | >2.5 | 0.31 | 0.02 | 92 |
| 50 | >2.5 | 0.57 | 0.12 | 0.07 | >2.5 | 0.50 | 0.05 | 90 |
| 70 | >2.5 | 0.85 | 0.21 | 0.14 | >2.5 | 0.71 | 0.07 | 89 |

As shown in Table 5A and Table 5B, Sample 3482-13-1, which was assembled with only flat substrate sheets and no other elements such as spacer strips, spacer sheets, or patterning, exhibited pressure drop and net pressure drop exceeding 2.5 kPa under all flow rates. Sample 3469-65-1 was improved by the surface patterning imparted to the substrate sheets, but still exhibited pressure drop of 0.85 kPa and net pressure drop of 0.71 flow rates of 70 L/min of dry air. Sample 3469-71-6, which is representative of an embodiment of the invention, had the highest performance, with a pressure drop of 0.21 kPa and a net pressure drop of 0.07 kPA when the flow rate was 70 L/min of dry air.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 layers refers to groups having 1, 2, or 3 layers. Similarly, a group having 1-5 layers refers to groups having 1, 2, 3, 4, or 5 layers, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A sorbent material sheet product comprising:

a unitary sorbent sheet including:

a substrate sheet;

a spacer sheet having a plurality of spaced apart strips and a plurality of intervening spaces formed by cutting and removing a plurality of sections from a solid material sheet; and a reinforcing layer comprising an adsorbent material;

wherein the substrate sheet and the spacer sheet are arranged as adjacent touching layers and each of the substrate sheet and the spacer sheet are made from sorbent material, wherein the sorbent material sheet product exhibits a net pressure drop of less than about 0.10 kPa at a flow rate of about 4.24 L/(min*$cm^2$) of dry air, and wherein the sorbent material sheet product has a thickness of less than about 2.5 mm.

2. The sorbent material sheet product of claim 1, wherein each sorbent material of the substrate sheet and the spacer sheet is different.

3. The sorbent material sheet product of claim 1, wherein the unitary sorbent sheet comprises a plurality of spacer sheets and at least one of the plurality of spacer sheets is a continuous spacer sheet that is made from foam and does not have any intervening spaces.

4. The sorbent material sheet product of claim 1, wherein one or more of the plurality of spaced apart strips comprise at least two sub-strips forming a cross-channel between adjacent ones of the intervening spaces.

5. The sorbent material sheet product of claim 1, wherein the substrate sheet has a length and a width and the spacer sheet has a length and a width, wherein the length of the substrate sheet and the length of the spacer sheet are substantially the same and the width of the substrate sheet and the width of the spacer sheet are substantially the same.

6. The sorbent material sheet product of claim 1, wherein the substrate sheet has a length and a width and the spacer sheet has a length and a width, wherein the substrate sheet and the spacer sheet are different from each other at least with respect to length or width.

7. The sorbent material sheet product of claim 1, wherein the spacer sheet has a length and a width, and further comprises frame sections along the length and frame sections along the width, wherein the plurality of spaced apart strips extend perpendicularly between the frame sections along the width of the spacer sheet.

8. The sorbent material sheet product of claim 1, wherein the spacer sheet has a length and a width, wherein the spaced apart strips extend perpendicularly to the length of the spacer sheet.

9. The sorbent material sheet product of claim 8, wherein adjacent ones of the plurality of spaced apart strips form the plurality of intervening spaces such that the plurality of intervening spaces extend between and are open at each longitudinal edge.

10. The sorbent material sheet product of claim 1, wherein the unitary sorbent sheet is spiral wound to form adjacent layers of the unitary sorbent sheet such that fluid can flow around and between adjacent layers of the unitary sorbent sheet.

11. The sorbent material sheet product of claim 1, wherein the unitary sorbent sheet has a generally cylindrical shape having a length that is greater than a diameter of the sorbent sheet.

12. The sorbent material sheet product of claim 1, wherein the unitary sorbent sheet is spiral wound about a core such that fluid can flow around and between adjacent sheet layers.

13. The sorbent material sheet product of claim 12, wherein the core is made from a sorbent material.

14. The sorbent material sheet product of claim 1 further comprising a housing that at least partially encapsulates the unitary sorbent sheet.

15. The sorbent material sheet product of claim 14, wherein the housing is flexible.

16. The sorbent material sheet product of claim 14, wherein the housing is a vapor adsorbing canister.

17. The sorbent material sheet product of claim 16, wherein the vapor adsorbing canister is part of an onboard refueling vapor recovery apparatus.

* * * * *